United States Patent
Kautz et al.

(10) Patent No.: US 8,462,771 B2
(45) Date of Patent: *Jun. 11, 2013

(54) METHOD FOR CHANGING BETWEEN A PACKET-ORIENTED PTT SESSION AND A CIRCUIT-ORIENTED TELEPHONE CONNECTION BETWEEN AT LEAST TWO RADIO COMMUNICATION APPLIANCES, ASSOCIATED RADIO COMMUNICATION APPLIANCE, NETWORK COMPONENT AND RADIO COMMUNICATION SYSTEM

(75) Inventors: Olaf Kautz, Berlin (DE); Josef Laumen, Hildesheim (DE); Norbert Schwagmann, Braunschweig (DE)

(73) Assignee: Siemens Aktiengesellschaft, Munich (DE)

( * ) Notice: Subject to any disclaimer, the term of this patent is extended or adjusted under 35 U.S.C. 154(b) by 1028 days.

This patent is subject to a terminal disclaimer.

(21) Appl. No.: 12/397,745

(22) Filed: Mar. 4, 2009

(65) Prior Publication Data

US 2009/0176461 A1 Jul. 9, 2009

Related U.S. Application Data

(63) Continuation of application No. 10/786,683, filed on Feb. 25, 2004, now Pat. No. 7,522,584.

(30) Foreign Application Priority Data

Feb. 13, 2004 (DE) .................. 10 2004 007 216

(51) Int. Cl.
*H04L 12/66* (2006.01)
(52) U.S. Cl.
USPC ... 370/354; 379/157; 379/220.01; 455/414.1; 455/552.1; 709/227
(58) Field of Classification Search
USPC ....... 370/259–271, 310–356; 455/412.1–420, 455/426.1, 426.2, 445, 550.1–560; 709/201–207, 217–248
See application file for complete search history.

(56) References Cited

U.S. PATENT DOCUMENTS

| | | | |
|---|---|---|---|
| 5,592,538 A * | 1/1997 | Kosowsky et al. | 379/93.08 |
| 6,781,983 B1 * | 8/2004 | Armistead | 370/353 |
| 6,879,828 B2 * | 4/2005 | Virtanen et al. | 455/426.1 |
| 7,170,863 B1 * | 1/2007 | Denman et al. | 370/260 |

(Continued)

FOREIGN PATENT DOCUMENTS

| | | |
|---|---|---|
| JP | 3289725 A | 12/1991 |
| WO | 02/061976 A1 | 8/2002 |
| WO | 03/037010 A1 | 5/2003 |

OTHER PUBLICATIONS

3GPP; 3GPP TS 24.008; "Mobile Radio Interface Layer 3 Specification; Core Network Protocols; Stage 3", www.3gpp.org/ftp/specs/html-info/24008.htm; 3 pages, Printed Jun. 20, 2011.

(Continued)

*Primary Examiner* — Hemant Patel
(74) *Attorney, Agent, or Firm* — King & Spalding L.L.P.

(57) ABSTRACT

To change between a packet-oriented PTT session and a circuit-oriented telephone connection as selectable communication connections between at least one first connected radio communication appliance and at least one second connected radio communication appliance in a radio communication system, a first of these two communication connections is selected and set up by at least one connected radio communication appliance and/or by at least one control unit in the radio network in the radio communication system. A change is made from this first communication connection, which has been set up, to the second communication connection under the control of a radio communication appliance which is connected to the first communication connection and/or under the control of that control unit in the radio network in the radio communication system which is connected to the first communication connection by activating the second communication connection while the first communication connection still exists.

14 Claims, 7 Drawing Sheets

U.S. PATENT DOCUMENTS

| | | | |
|---|---|---|---|
| 7,191,233 B2 * | 3/2007 | Miller | 709/227 |
| 7,218,630 B1 | 5/2007 | Rahman | 370/355 |
| 7,512,114 B2 * | 3/2009 | Laturell | 370/352 |
| 7,522,584 B2 * | 4/2009 | Kautz et al. | 370/354 |
| 7,600,009 B2 * | 10/2009 | Soininen et al. | 709/223 |
| 2001/0036174 A1 * | 11/2001 | Herring | 370/352 |
| 2002/0055350 A1 * | 5/2002 | Gupte et al. | 455/412 |
| 2003/0086390 A1 * | 5/2003 | Eschbach et al. | 370/329 |
| 2004/0001474 A1 * | 1/2004 | Simelius et al. | 370/349 |
| 2004/0171370 A1 * | 9/2004 | Natarajan | 455/413 |
| 2004/0196826 A1 * | 10/2004 | Bao et al. | 370/352 |
| 2005/0282541 A1 * | 12/2005 | Iizuka et al. | 455/426.2 |

OTHER PUBLICATIONS

3GPP; 3GPP TS 23.228; "IP Multimedia Subsystem (IMS); Stage 2", www.3gpp.org/ftp/specs/html-info/23228.htm; 3 pages, Printed Jun. 20, 2011.

"Terrestrial Trunked Radio (TETRA); Voice plus Data (V+D) Part 2: Air Interface (AI); ETSI TS 100 392-2", ETSI Standards European Telecommunications Standards Intitute Sophia Antipo, FR., Bd TETRA 3, Nr. V241, pp. 642-643, XP002327397, Oct. 2003.

"OHMA-AD PoC V1 0-20030204-D Push to Talk over Cellular (PoC) Architecture Draft Version 1.0", Announcement Open Mobile Alliance, Nr. Version 10.4, pages complete, XP002327398, Feb. 4, 2004.

3GPP Group Services and System Aspects "TR 23 979 V1.1.0: 3GPP Enablers for OMA PoC Services" 3GPP TR 23.979 V1.1.0, pages complete XP002321832, Aug. 2004.

"OMA-AD-PoC-V1 0-20040719D Push to talk over Cellular (PoC) Architecture Draft Version 1.0", Announcement Open Mobile Alliance, Nr. Version 10, pages complete, XP002311851, Jul. 10, 2004.

* cited by examiner

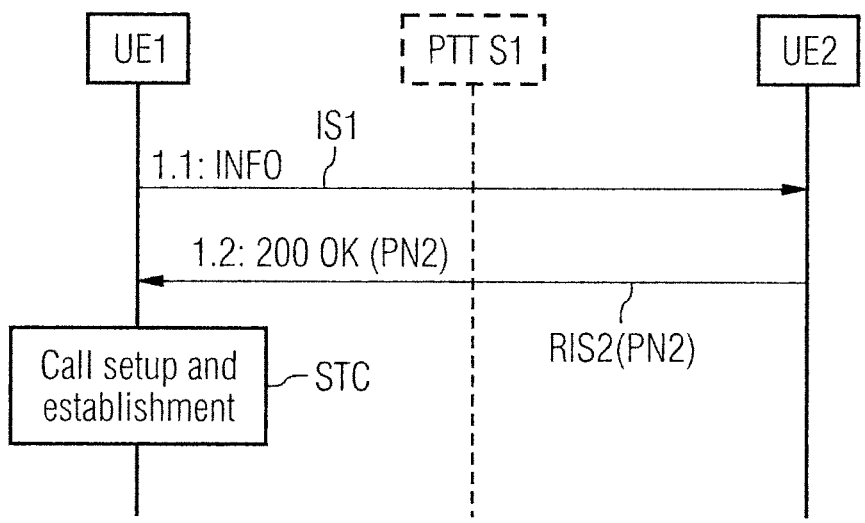
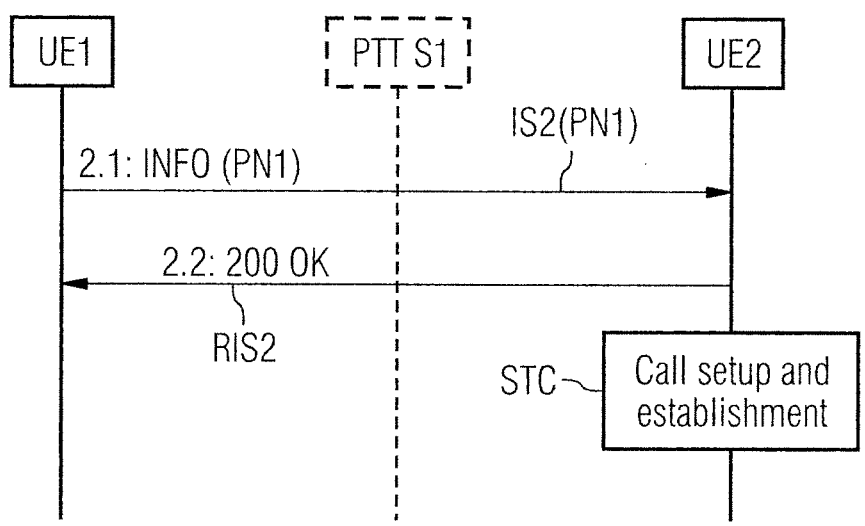

METHOD FOR CHANGING BETWEEN A PACKET-ORIENTED PTT SESSION AND A CIRCUIT-ORIENTED TELEPHONE CONNECTION BETWEEN AT LEAST TWO RADIO COMMUNICATION APPLIANCES, ASSOCIATED RADIO COMMUNICATION APPLIANCE, NETWORK COMPONENT AND RADIO COMMUNICATION SYSTEM

CROSS-REFERENCE TO RELATED APPLICATIONS

1. Technical Field

The present invention relates to a method for changing between a packet-oriented PTT session and a circuit-oriented telephone connection between at least two radio communication appliances, associated radio communication appliance, network component and radio communication system.

2. Background

In order for, by way of example, two users in a radio communication system to be able to use their radio communication appliances to converse with one another or to interchange other user data, a "circuit-oriented" ("circuit switched") telephone connection is usually set up between these two radio communication appliances using their air interfaces to the radio network. This circuit-oriented telephone connection allows the users of the two radio communication appliances to speak and to listen simultaneously, i.e. to communicate at the same time, using the "full duplex" method, i.e. in the forward and back transmission directions. In this case, the respective circuit-oriented telephone connection which has been set up between the radio communication appliances connected is maintained even if none of the users of the radio communication appliances connected is speaking or, considered in general terms, is transmitting user data. The telephone connection between the two radio communication appliances thus remains continually set up until one of the radio communication appliances actively initiates cleardown of the telephone connection.

By contrast, a "push-to-talk (PTT)" service is advantageous in practice for many communication situations. Such a PTT service involves a plurality of radio communication appliances, which means that they form a specific PTT group. In this context, only a respective one from a plurality of connected radio communication appliances simultaneously has an associated transmission authorization for transmitting or sending user data, particularly voice messages, to the remaining radio communication appliances connected to the PTT service. The user of a radio communication appliance is allocated the transmission authorization in this case, by way of example, by virtue of his actively requesting it from his appropriate network PTT server by pressing a special PTT key on his radio communication appliance. If this user presses the PTT key on his radio communication appliance first as compared with the other users connected to the PTT service, then he is granted the transmission or sending authorization to transmit a voice message or other user data to the other radio communication appliances connected by the PTT server as priority. While he keeps the PTT key pressed, only he has the transmission authorization allocated by the PTT server, while the ability to send is disabled for the users of the remaining radio communication appliances connected. In this case, the voice or user data are distributed in the radio network, while the sender is actually speaking, from the latter's radio communication appliance to the receiving radio communication appliances in the PTT group virtually in real time, particularly via the appropriate PTT server (streaming). In particular, the PTT server can, in this context, prescribe a maximum authorization period within which sending is possible only for the currently authorized sender. While voice or other user data are being sent by the respective radio communication appliance with authorization to transmit, the other connected radio communication appliances in the same PTT group can merely receive the voice or user messages sent by the radio communication appliance with authorization to transmit, and cannot themselves send or deliver their own voice messages using the PTT server. Only when the user with the current authorization to transmit lets go of or releases the PTT key on his radio communication appliance does he relinquish his exclusive authorization to transmit. The PTT server then preferably reallocates this authorization to that radio communication appliance whose user pressed the PTT key on his radio communication appliance next. In other words, this means that, when a voice message is sent by the respective radio communication appliance with authorization to transmit, the remaining radio communication appliances connected to the PTT service only listen to this voice message and cannot interrupt the user of this transmitting radio communication appliance.

In this way, the PTT service makes it possible for just a single radio communication appliance from the group of radio communication appliances connected to the respective PTT service to be able to dispatch or send a voice message or other user data to said radio communication appliances simultaneously using the "half duplex" method without being able to be interrupted by them in the process. Preferably, the respective user of a particular PTT service who has authorization to transmit is able to send one or more receiving radio communication appliances, as members of this PTT service, a voice or user message simultaneously and virtually in real time after he has pressed a special PTT key on his radio communication appliance. The users of the one or more receiving radio communication appliances connected to the PTT service are subsequently able to send a response in a corresponding manner when the PTT key has been let go on the radio communication appliance which currently has authorization to transmit. To this end, in turn, only a respective one of the radio communication appliances ready to respond is allocated authorization to transmit by the respective appropriate PTT server, while all the remaining connected radio communication appliances in the PTT group are merely able to receive this response message and are disabled for sending a response while it is being transmitted. Any radio communication appliance which belongs to the same PTT group and wishes to dispatch a voice message or user data is allocated authorization to transmit, on requesting it from the network's appropriate PTT server, in a corresponding manner by the latter, during which the remaining connected radio communication appliances in the PTT group are merely authorized to receive. It may be expedient, in particular, for the user of the respective, receiving radio communication appliance in the PTT group to be able to send voice messages or user data to the PTT server during the actual period of authorization of the respective radio communication appliance with authorization to transmit, or for the PTT server to continue to block forwarding of said voice messages or user data and to perform buffer-storage. Only when the transmission has ended or the maximum permitted authorization period for the current radio communication appliance with authorization to transmit has expired is the allocation of the transmission authorization by the appropriate PTT server controlled such that the latter forwards buffer-stored or current voice messages from that radio communication appliance whose user pressed the PTT key next before any of the other members of the PTT group. In this way, the PTT service is similar, from the user's point of view, to the known "walkie-talkie" service associated with conventional CB radio. Unlike the latter, however, the respective radio communication appliance with authorization to transmit can now also use the radio network in the respective radio communication system to address distant radio communication appliances which are registered with the same PTT service. In particular, the radio communication appliances logged onto the respective PTT service may be in different radio cells in a radio communication system.

Expediently, the maximum permissible authorization period for the transmission right can be set at an upper time limit by the PTT server. In that case, the user of the respective radio communication appliance with authorization to transmit is able to send voice or user messages to the remaining radio communication appliances connected only up to this maximum permissible upper time limit, even if he continues to keep his PTT key pressed. Furthermore, the respective radio communication appliance may possibly be connected to a plurality of PTT services simultaneously.

For modern radio communication systems, it is desirable, in particular, to implement such a PTT service on a packet switched basis. In radio communication systems, this is preferably done using the IP multimedia subsystem (IMS) or a suitable system for implementing this. Appropriate activities in this regard are performed on international standardization committees, such as "Open Mobile Alliance (OMA)" and "3rd Generation Project Partnership (3GPP)".

While the full duplex principle of the circuit-oriented telephone connection between two respective radio communication appliances promotes reciprocal, simultaneous interchange of voice messages and other user data in the forward and back directions, the half duplex method of a PTT service supports the sporadic dispatch of a voice message or of other user data by a single radio communication appliance in the PTT group of this PTT service simultaneously to all members of this PTT group in the forward direction only. If a member of the respective PTT group wishes to make a voice announcement to all other members of this PTT group, then he can do so spontaneously after operating a special PTT key, for example. This means that radio resources and radio network resources are used, with a corresponding resultant cost, only if a voice message is actually sent within the PTT group.

A typical instance of application for the PTT service arises, by way of example, when the organization control center in a logistics company wishes to make contact with one or more of its HGV drivers now and again in order to give new instructions. Conversely, it is desirable for the respective HGV driver to return a short voice message or response to the organization control center every now and then. To allow this sporadic sending of voice messages, a PTT session is continuously maintained between the organization control center and the respective HGV driver during work hours. If one of the HGV drivers connected or the organization control center wishes to make a voice announcement to the other connected members of this PTT group, he/it can do so spontaneously after respectively operating the PTT key on his/its radio communication appliance, for example. This means that radio resources and capacities in the radio network are engaged only if voice messages or user data are actually being sent by the respective radio communication appliance with authorization to transmit. In general terms, a PTT session is expedient when, from the point of view of time, voice messages or user data are being sent only now and then, and always in one particular direction of transmission. By contrast, it would be too complicated and too time-consuming in such cases to set up respective individual telephone connections between the respective radio communication appliance with authorization to send and all other receiving radio communication appliances in the respective PTT group involved. Such telephone connections set up on a continuous basis would be too expensive and would engage too much transmission capacity in the radio network and particularly on the air interface for the radio communication appliances connected.

If, by contrast, it is desirable not only to send a single voice message from the respective radio communication appliance to all other radio communication appliances in the respective PTT group in the forward direction, but rather to have a reciprocal discussion or conversation between at least two connected radio communication appliances simultaneously in the forward and back directions, then a PTT session's properties in connection with the half duplex transmission method are more of a drawback. This is because anyone wishing to use his radio communication appliance to dispatch a voice message to the other radio communication appliances in a PTT group disables dispatch of a voice message by the receiving radio communication appliances during the transmission period. The receiver thus cannot interrupt the sender or cannot cut him short if he is currently saying something. In addition, anyone wishing to dispatch a voice message is, in practice, given authorization to speak only if he has previously pressed a "PTT key" on his radio communication appliance. These are factors which are disadvantageous during a discussion or in the course of a conversation, which means that a telephone connection between the radio communication appliances connected would be more suitable.

SUMMARY

According to various embodiments, a way can be provided in which the user of a radio communication appliance can be provided flexibly and conveniently with a communication connection which is matched to the respective communication situation.

According to an embodiment, a method for changing between a packet-oriented PTT session and a circuit-oriented telephone connection as selectable communication connections between at least one first connected radio communication appliance and at least one second connected radio communication appliance in a radio communication system, where a first of these two communication connections is selected and set up by at least one connected radio communication appliance and/or by at least one control unit in the radio network in the radio communication system, and where a change is made from this first communication connection, which has already been set up, to the second communication connection under the control of a radio communication appliance which is connected to the first communication connection and/or under the control of that control unit in the radio network in the radio communication system which is connected to the first communication connection by activating the second communication connection while the first communication connection still exists.

By activating the second communication connection while the first communication connection still exists, it is possible to change between the two communication connections largely fluently: depending on the communication situation involved, the user of the respective connected radio communication appliance can select and change to that of the two communication connection types whose situation is more favorable. The fact that activation of the second communication connection is actually initiated while the respective first communication connection still exists allows the user of the respective radio communication appliance to change from the first to the second communication connection largely seamlessly. Specifically, it is possible to change over from an already existing, packet-oriented PTT session between at least one first radio communication appliance and at least one second radio communication appliance to a circuit-oriented telephone connection between these connected radio communication appliances largely fluently while the PTT session or phase is ongoing. Conversely, it is possible to change over from an already existing circuit-oriented telephone connection which has been set up between at least one first and at least one second radio communication appliance to a packet-oriented PTT session largely fluently by activating the required PTT session while the existing, circuit-oriented telephone connection is still ongoing. This gives the respective user the flexible and convenient selection of that communication connection type which is more specifically suited to his respective communication situation currently involved, i.e. he is able to select that communication type which is better suited to a specific communication situation. This allows him to gear his respective communication connection to altered communication requirements on an individual basis.

It can be particularly advantageous if the first radio communication appliance uses the first communication connection, which has already been set up, to send the second radio communication appliance at least one control signal which is used to notify the second radio communication appliance of the request from the first radio communication appliance to change from the first communication connection, which has already been set up, to the second communication connection.

Additionally or independently of this, it can be expedient for the first and/or the second radio communication appliance connected to the first communication connection, which has already been set up, to send that control unit which is responsible for the first communication connection, which has been set up, at least one control signal which is used to notify this control unit of the request from the first and/or the second radio communication appliance to change from the first communication connection to the second communication connection. Additionally or independently of this, it can be advantageous if the first and/or second radio communication appliance connected to the first communication connection, which has already been set up, sends that control unit which is responsible for the second communication connection, which needs to be set up, at least one control signal which is used to notify this control unit of the request from the first and/or the second radio communication appliance to change from the first communication connection to the second communication connection. It may possibly also be expedient if the control unit connected to the first communication connection, which has already been set up, sends the control signal relating to the need to change from the first and/or the second radio communication appliance to that control unit which is responsible for activating and setting up the second communication connection.

Advantageously, such a control signal has inserted into it one or more address parameters for that radio communication appliance, connected to the first communication connection, to which the need to change is directed and/or for that radio communication appliance, connected to the first communication connection, from which the need to change issues, and/or at least one identification parameter for distinguishing the first communication connection, which has already been set up, for the second communication connection, which needs to be set up. The identification parameter in the control signal is used to associate the first communication connection, which has already been set up, with the second communication connection, which is yet to be set up, so that an explicit link is brought about between the first communication connection, which has already been set up, and the required, second communication connection.

This provides an association or link between the two communication connections which allows them to be explicitly associated with or related to one another. In this case, the identification parameter (as the link parameter or concatenation parameter) represents the first communication connection, which has already been set up and which is intended to be replaced by the new, second communication connection on the basis of the need for the user of one of the radio communication appliances connected to the first communication connection to change. This makes it possible to indicate, particularly to the respective radio communication appliance to which the need to change is directed, and/or to the control unit which is responsible for the new, second communication connection, that the first communication connection, which already exists, is associated with the second communication connection, to which the change is currently being made. This is advantageous, by way of example, when a change is made from the PTT service to the telephone connection between two connected radio communication appliances, and a telephone call is simultaneously arriving on one of the connected radio communication appliances from a third radio communication appliance, which is not connected to the PTT service. On the basis of the identification parameter, the radio communication appliance in question then receives an explicit indication of that telephone connection which is associated with the preceding PTT session. This implements a type of filter function which allows the respective radio communication appliance to find out or to distinguish which of the telephone calls arriving in parallel is actually associated with the previously existing PTT session. Similarly, the link or the relationship between a telephone connection which has already been set up between at least two radio communication appliances and a subsequent, specific PTT session is also communicated, with the involvement of the same radio communication appliances, when changing from the telephone connection to the PTT session by transferring an identification parameter for the telephone connection to the control unit which is responsible for the second communication connection and/or to that radio communication appliance connected to the first communication connection to which the need to change is directed and/or from which it is initiated. The respective identification parameter transferred, as a representative of the first communication connection, allows, in a particularly advantageous and convenient manner, an automatic change to the new required, second communication connection, without the user of the radio communication appliance to which the need to change is directed needing to intervene actively himself.

Expediently, the identification parameter is sent to the radio communication appliance to which the need to change is directed by another radio communication appliance connected to the first communication connection. If the change is activated and controlled by a control unit in the radio network, then it is expedient for the identification parameters also to be sent to all the radio communication appliances which are connected to the first communication connection and are now affected by the change to the second communication connection.

According to another embodiment, a radio communication appliance may have a control unit for performing the inventive method.

In addition, according to yet another embodiment, a network component may have a control unit for performing the inventive method.

Furthermore, according to yet another embodiment, a radio communication system may have a first group of network components for selecting and providing a packet-oriented PTT session and also having a second group of network components for selecting and providing a circuit-oriented telephone connection as selectable communication connections between at least one first connected radio communication appliance and at least one second connected radio communication appliance in a radio communication system, the two groups of network components each having control means for carrying out the inventive method.

BRIEF DESCRIPTION OF THE DRAWINGS

The invention and its developments are explained in more detail below with reference to drawings, in which.

Elements having the same function and action are each provided with the same reference symbols in FIGS. 1 to 8.

DETAILED DESCRIPTION

Figure 1:
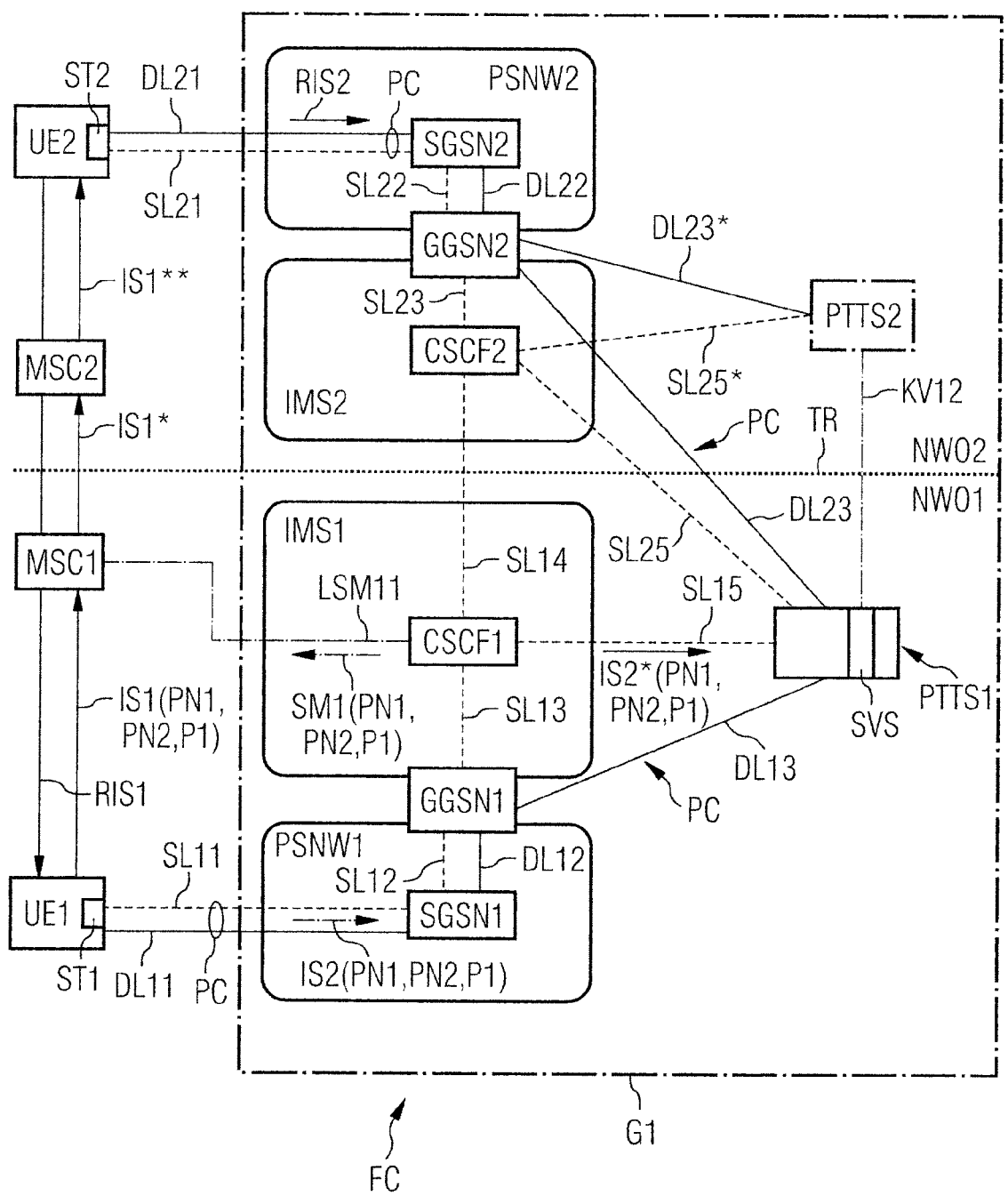
FIG. 1 shows a schematic illustration of the main components of the network architecture in a radio communication system for setting up a packet-oriented PTT session between at least two radio communication appliances, from which different variants of the inventive method are used to change to a circuit-oriented telephone connection between two connected radio communication appliances.

FIG. 1 schematically shows main components in a network architecture as part of a radio communication system FC which are used to provide two radio communication appliances UE1, UE2, for example, with a PTT service PC as a first communication connection type. In this case, the first radio communication appliance UE1 and the second radio communication appliance UE2 are connected to a common PTT server PTTS1, the first radio communication appliance UE1 being connected via network components, such as PSNW1, IMS1, MSC1, belonging to a first network operator or network provider NWO1 and the second radio communication appliance UE2 being connected via network components PSNW2, IMS2, MSC2 belonging to a second network operator NWO2. Said PTT server controls the interchange of voice and/or other user messages between the two radio communication appliances UE1, UE2 in line with the known "push-to-talk" principle. The association between the respective radio communication appliance UE1 or UE2 and between its network-allocated components and the respective network operator NWO1 or NWO2 is illustrated in FIG. 1 by a dotted dividing line TR. Signaling connections between the respective radio communication appliance and its network-allocated network components from the respective network operator are shown in dashes in FIG. 1, while associated, separate data connections are shown by means of solid lines.

Specifically, the first radio communication appliance UE1 has access to a network-allocated "packet switched network", that is to say to a packet-oriented radio network PSNW1 belonging to its provider NWO1, via a "radio access network", which has been omitted in FIG. 1 in the present case for the sake of clarity of the drawing. Such a "packet switched network" can be formed by GPRS (General Packet Radio Service) network, for example. As primary components, it has an "SGSN" (Serving GPRS Support Node) element, i.e. for a GPRS network node SGNS1, and also a "GGSN" (Gateway GPRS Support Node) element or gateway GGSN1. The first radio communication appliance UE1 is connected to the SGSN element SGSN1 in the "packet switched network" PSNW1 via a communication connection SL11 for the purpose of sending control or signaling signals and via a communication connection DL11 for the purpose of sending user data. Control signals are interchanged between the SGSN element SGSN1 to the GGSN element GGSN1 via a signaling connection SL12, and data are interchanged via a data connection DL12. The GGSN element GGSN1 provides a signaling connection SL13 for the CSCF ("Call State Control Function") element CSCF1 in an "IP multimedia subsystem (IMS)" IMS1. This subsystem is a radio network part which uses the IP protocol to control the communication traffic between the radio communication appliance UE1 and the PTT server PTTS1. The CSCF component CSCF1 has, in turn, a signaling connection SL15 for the PTT server PTTS1. In this way, the GGSN component GGSN1 has a signaling connection indirectly via the CSCF component CSCF1 for the PTT server PTTS1. In addition, it has a direct, separate data connection DL13 for the PTT server PTTS1.

Similarly, the second radio communication appliance UE2 uses a signaling connection SL21 and a data connection DL21 to communicate with the SGSN component SGSN2 in a "packet switched network", i.e. a packet-switching network part PSNW2 belonging to his provider NWO2. This SGSN component SGSN2 interchanges control signals via a dedicated connection SL22 and data signals via a dedicated data connection DL22 with a GGSN component GGSN2 which provides a gateway, that is to say an access to the "IP multimedia subsystem" IMS2. The GGSN component GGSN2 provides a direct data connection DL23 to the common PTT server PTTS1. Any signaling in the "IP multimedia system" IMS2 is routed via a CSCF component CSCF2, which is a core element in the "IP multimedia subsystem" IMS2. For this purpose, the GGSN component GGSN2 has a signaling connection SL23 for the CSCF component CSCF2. The CSCF component CSCF2 is also used to address the common PTT server PTTS1 using a signaling connection SL25. The CSCF component CSCF2 may also be used to control further application servers if appropriate.

Preferably, the "SIP" protocol (Session Initiation Protocol) is used for the signaling between the two radio communication appliances UE1, UE2 and the common PTT server PTTS1 and also the interposed network components SGSN1, GGSN1, CSCF1, CSCF2, GGSN2, SGSN2.

If, by way of example, the user of the first radio communication appliance triggered the PTT key on this appliance first, then the PTT server PTTS1 allocates him an authorization to transmit for a maximum authorization period within which he is able to send the second radio communication appliance UE2 a voice message or other user data under the mediation of the common PTT server PTTS1. While the right to send or transmit is being engaged by the first radio communication appliance UE1, the PTT server PTTS1 removes the authorization to transmit from the second radio communication appliance UE2, which means that it can merely receive messages. Following termination of the sending of voice or user data by the first radio communication appliance UE1, which is brought about by letting go of the latter's PTT key, in particular, the PTT server PTTS1 removes the authorization to transmit from the first radio communication appliance UE1. This means that, although the first radio communication appliance UE1 is still able to send voice messages or other user messages to the PTT server PTTS1 in the form of packet data, the PTT server PTTS1 disables forwarding thereof to the second radio communication appliance UE2 and rejects these packet data. Alternatively, these packet data can be buffer-stored until the PTT server PTTS1 reallocates the transmission authorization to the first radio communication appliance upon a fresh request from the latter's user. This presupposes that the user of the second radio communication appliance UE2 has not already picked up authorization beforehand and is still speaking.

Considered on a general basis, the user of the respective radio communication appliance is able to press the PTT key on his radio communication appliance in order to request from the PTT server the sole authorization to transmit in order to send a message to other connected radio communication appliances occasionally. The PTT server then allocates this requesting radio communication appliance the sole authorization to transmit for a prescribable authorization period if another connected radio communication appliance does not have an earlier time ranking for its authorization request. This means that only one of the radio communication appliances connected to the PTT service is ever allocated the sole transmission right by the PTT server during the same time. In this case, the PTT server controls the forwarding of messages from the radio communication appliance with authorization to transmit. Hence, only the respective radio communication appliance with authorization to send is able to dispatch a message by switching through the common PTT server, while the one or more other radio communication appliances connected to the PTT service can merely receive this message and, for their part, are not simultaneously able to send voice messages to the connected radio communication appliances in the opposite direction. However, packet data transmission allows them to send messages to the common PTT server. There, any messages arriving from them are either rejected or buffer-stored until the radio communication appliance currently authorized to transmit has the authorization to transmit removed from it again by the PTT server. While the messages from the radio communication appliance currently authorized to transmit are being sent in the forward direction to the other connected radio communication appliances, the PTT server thus does not switch through messages from these other radio communication appliances in the opposite direction. While the user of the respective radio communication appliance with authorization to send is speaking, the users of the one or more other connected radio communication appliances can merely listen and cannot interrupt the speaking user of the radio communication appliance with authorization to send while his voice message is being dispatched.

Possibly, instead of the PTT server PTTS1 jointly associated with the radio network parts belonging to the two providers NWO1, NWO2, a respective dedicated, separate PTT server may be provided for each radio network part belonging to the two providers NWO1, NWO2. Specifically, the "IP multimedia subsystem" IMS1 and the "packet switched network" PSNW1 belonging to the first provider NWO1 then have just the PTT server PTTS1 associated with them, while the "IP multimedia subsystem" IMS2 and the "packet switched network" PSNW2 belonging to the second provider NWO2 have a dedicated PTT server PTTS2 associated with them specifically. This dedicated PTT server is shown additionally by a dash-dot line in FIG. 1. It has a signaling connection SL25* for the CSCF component CSCF2 and a data connection DL23* for the GGSN2 component GGSN2 in a similar manner to the communication connection scheme for the PTT server PTTS1. The two PTT servers PTTS1, PTTS2, for their part, have a common communication connection KV12 between them which can be used to transmit data and/or control signals. The connections DL23 and SL25 for the first PTT server PTTS1 can then be expediently omitted. Preferably, that PTT server which is responsible for the radio communication appliance which initiated or started the PTT session has control over the PTT session. In this case, in the exemplary embodiment shown in FIG. 1, the PTT session PC has been initiated by the radio communication appliance UE1, and therefore the PTT server PTTS1 specifically allocated by its provider NWO1 on the network is responsible for controlling the sequence of the PTT session PC. In this case, the second PTT server PTTS2 forms a passive component and is used merely for simply forwarding the voice messages or user data sent by the first, controlling PTT server PTTS1 to the second radio communication appliance UE2.

It is naturally also possible for the second PTT server PTTS2 allocated at the reception end to control or coordinate the sending of messages to the second radio communication appliance UE2 instead of the first, transmission end PTT server PTTS1. To this end, the first PTT server PTTS1 uses the communication connection KV12 for the purpose of directly routing the voice messages dispatched by the first radio communication appliance UE1 to the second PTT server PTTS2, which then actively regulates or controls delivery thereof.

It may now arise that the users of the two radio communication appliances UE1, UE2 do not wish to send each other just occasional voice messages now and then, but rather wish to hold a reciprocal, continuous conversation or discussion with one another. Since a normal telephone connection is better suited to this altered communication requirement, the activation of a circuit-oriented telephone connection between the radio communication appliances UE1, UE2 connected to the PTT service PC is initiated while the PTT session PC still exists. Considered in general terms, an ongoing PTT session between two or more connected radio communication appliances thus encounters a change to a normal telephone connection between these connected radio communication appliances. In this case, the PTT session is preferably implemented in the "packet switched domain", i.e. in the packet-oriented network part, using the "IP multimedia subsystem", while the normal telephone connection is implemented in the "public switched telephone network domain (circuit switched)", i.e. in a circuit-oriented network part.

In the present exemplary embodiment shown in FIG. 1 with the common PTT server PTTS1, the first radio communication appliance UE1, for example, initiates the change from the PTT session PC, which has already been set up, that is to say already exists, to a line-oriented telephone connection TC for the second radio communication appliance UE2 by virtue of its communicating its need to change to the second radio communication appliance UE2 connected to the PTT session using a control or notification signal IS1. In this control signal IS1, the first radio communication appliance UE1 preferably also transmits its own telephone number PN1 and, in particular, the telephone number PN2 of the second radio communication appliance UE2, which is to be called, to a switching unit MSC1, which is responsible for the provider NWO1 on the network, in the circuit-oriented network part. The switching unit MSC1 then sends a corresponding control signal IS1* with the telephone numbers PN1, PN2 to a switching unit MSC2, which is responsible at the reception end, in the circuit-oriented network part belonging to the second provider NWO2, with which the second radio communication appliance UE2 is associated. The switching unit MSC2 uses a request signal IS1** to ask the user of the second radio communication appliance UE2 whether the latter accepts the need to change from the first radio communication appliance. The user of the second radio communication appliance acknowledges this using a response signal RIS1, which is returned from the switching units MSC1, MSC2 to the requesting radio communication appliance UE1. Only in the event of positive acknowledgement of the need to change by the second radio communication appliance UE2 is a circuit-oriented telephone connection in the forward and back directions made available between the two radio communication appliances by the switching units MSC1, MSC2. The first radio communication appliance UE1 can thus use the network components which are responsible for a circuit-oriented telephone connection to initiate setup of a normal telephone connection to the second radio communication appliance UE2. In FIG. 1, for the sake of clarity of the drawing, only the switching units, particularly the "mobile switching centers" MSC1, MSC2 as main components, are shown to represent the components of the circuit-oriented part of the radio network. In this case, the switching unit MSC1 is associated with the first radio communication appliance, while the second switching unit MSC2 serves the second radio communication appliance UE2.

Possibly, the switching unit MSC1, MSC2 allocated at the transmission end and/or at the reception end may also automatically set up a circuit-oriented telephone connection in the forward and back directions immediately without consulting the user of the second radio communication appliance UE2, to which the need to change from the first radio communication appliance UE1 is directed. In other words, this means that the radio communication appliance with the need to change to the circuit-oriented telephone connection can set up this telephone connection to the second radio communication appliance UE2 directly, using the switching units MSC1, MSC2, without the need for it to send the request signal IS1** to the second radio communication appliance UE2. For the purpose of activation, it suffices for the first radio communication appliance UE1 merely to transmit the control signal IS1 to its responsible switching unit MSC1, which then performs all further steps to set up the circuit-oriented telephone connection. This is possible because the switching unit MSC1 is also sent the telephone number PN2 of the second radio communication appliance UE2 in the control signal IS1.

If an "SIP" (Session Initiation Protocol) session already exists between the two radio communication appliances UE1, UE2 via the "IP multimedia subsystems" IMS1, IMS2 responsible on the network, the first radio communication appliance UE1 already knows the SIP address of the second radio communication appliance UE2 and can therefore send the control or notification signal IS2 to the second radio communication appliance UE2 via the components CSCF1, CSCF2 on a direct transmission path, without the interposition of the PTT server PTTS1, using the SIP protocol. If appropriate, the radio communication appliance UE1 wishing to change may also form a "TelURI" as an SIP address from the telephone number (which is known) of the second radio communication appliance UE2, if said TelURI is stored on the network. This SIP address formation for the second user may be performed, particularly using the known telephone number of the second radio communication appliance, by a network component, such as the common PTT server PTTS1. Preferably, the control signal with the need to change from the user of the first radio communication appliance UE1 is also routed via the PTT server PTTS1 to the second radio communication appliance UE2, so that it is known to the latter. This notification signal is shown additionally by a dash-dot line in FIG. 1 and is provided with the reference symbol IS2*. If the user of the second radio communication appliance UE2 now accepts the need to change from the user of the first radio communication appliance UE1, he returns an acknowledgement signal RIS1 to the latter. In this case, the acknowledgement signal RIS2 can be actively generated by the user of the second radio communication appliance. In the same way, it may be expedient for the second radio communication appliance UE2 to generate the acknowledgement signal RIS2 independently (without consulting its user) and to return it to the requesting, first radio communication appliance UE1.

Additionally or independently of this, it may possibly also be expedient for the first radio communication appliance UE1 to send the PTT server PTTS1 a control or notification signal relating to its need to change, and for the latter then to forward a notification signal, with mediation by the CSCF component CSCF1 of the "IP multimedia subsystem" IMS1, to the switching unit MSC1, which belongs to the circuit-oriented network part of the radio communication system. In FIG. 1, this notification signal transmitted from the PTT server PTTS1 to the switching unit MSC1 via a signaling connection LSM11 is indicated by a dash-dot arrow denoted by SM1. The signaling connection LSM11 is likewise shown by a dash-dot line there. In general terms, a control unit which is responsible for the PTT session PC which has been set up thus sends a notification signal about the first radio communication appliance's need to change to that network-end control unit which is responsible for activating and setting up the circuit-oriented telephone connection TC. In particular, the control unit for the PTT session is formed by a PTT server in this case. The control unit used for the circuit-oriented telephone connection is an MSC switching unit, in particular.

The control or notification signals IS1, IS2, IS2*, SM1 can additionally be used to deliver, besides the telephone numbers PN1, PN2, an identification parameter P1, which explicitly identifies the active PTT session, so that the circuit-oriented telephone connection TC which has been freshly set up can be explicitly associated with the existing PTT session PC. The transfer parameters PN1, PN2, P1 each appear in brackets after the control signals IS1, IS2, IS2*, SM1 in FIG. 1. Only the added identification parameter P1 is able to bring about an explicit link, coupling or relationship between the already existing, specific PTT session PC and the required telephone connection TC (and vice versa), which makes it possible to distinguish this pair of communication connections PC, TC from other incoming calls and/or other PTT sessions. In particular, this formed pair comprising associated PTT session and telephone connection can be extracted, i.e. identified, from other, normal telephone calls and/or PTT sessions. Important.

Figure 2:
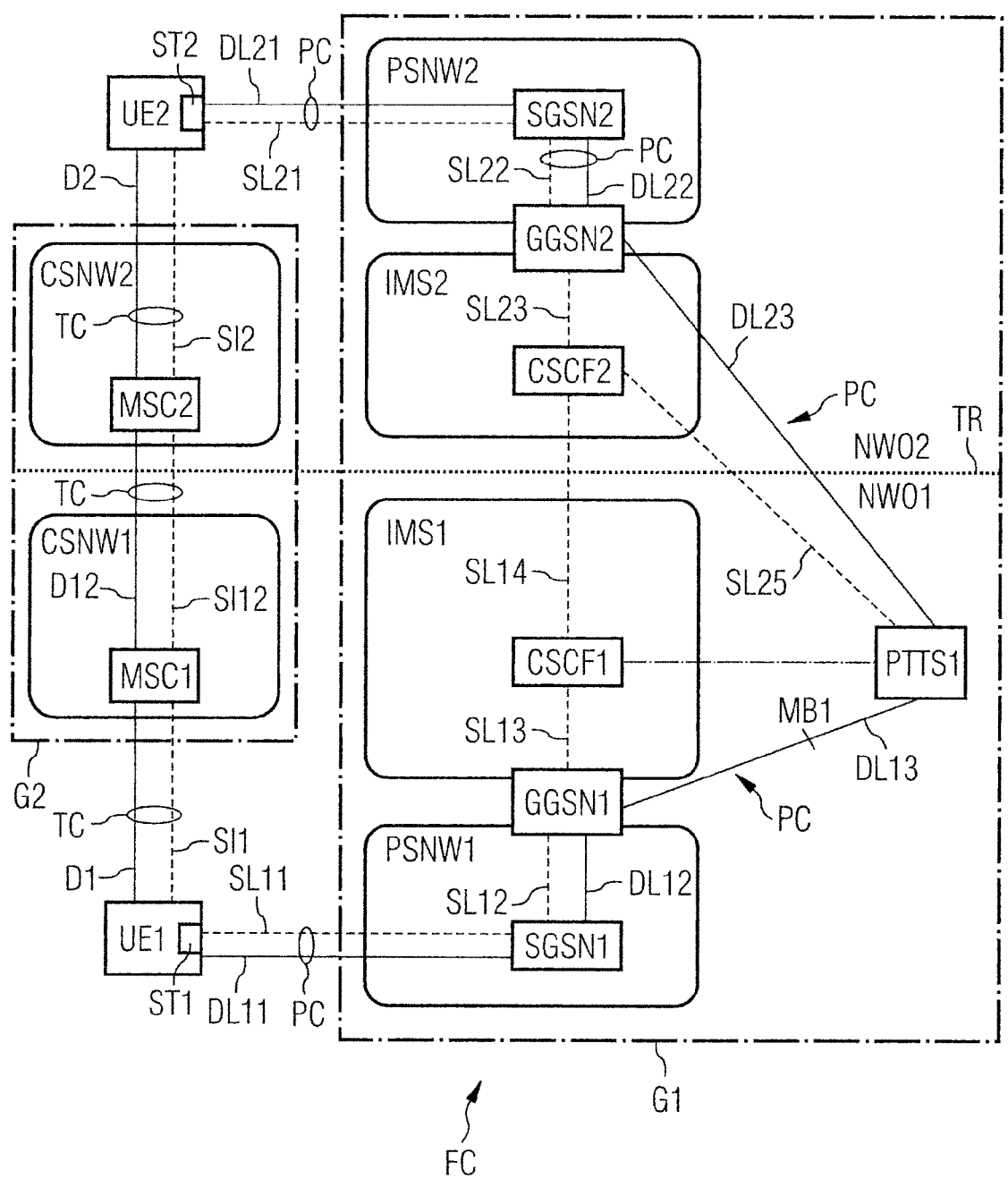
FIG. 2 shows a schematic illustration of additional network components in the network architecture shown in FIG. 1, which can be used for simultaneously, i.e. in parallel with the packet-oriented communication connection which has already been set up between the two radio communication appliances, setting up a circuit-oriented communication connection using different variants of the inventive method.

FIG. 2 shows the circuit-oriented telephone connection TC which has additionally been set up between the two radio communication appliances UE1, UE2. This circuit-oriented telecommunication connection TC now exists in parallel, that is to say simultaneously, with the PTT session PC which has already been set up or exists beforehand and from which the change to the normal telephone connection TC was initiated. In this case, the group of network components for selecting and providing the packet-oriented PTT session PC is denoted by G1 in FIG. 2, and the group of network components for selecting and providing the circuit-oriented telephone connection TC is denoted by G2. The telephone connection TC which has been set up comprises a signaling connection SI1 and a data connection D1 to the switching unit MSC1 allocated on the network from the first radio communication appliance UE1. This switching unit is representative of the other components of the circuit-oriented part CSNW1 of the radio network. The switching unit MSC1 is linked to the switching unit MSC2 via a signaling connection SI12 and a data connection D12. The switching unit MSC2 also represents the other components of the radio network's circuit-oriented part CSNW2, which is associated with the second radio communication appliance UE2. The second switching unit MSC2 is likewise connected to the second radio communication appliance UE2 by means of a corresponding signaling connection SI2 and a data connection D2.

Figure 3:
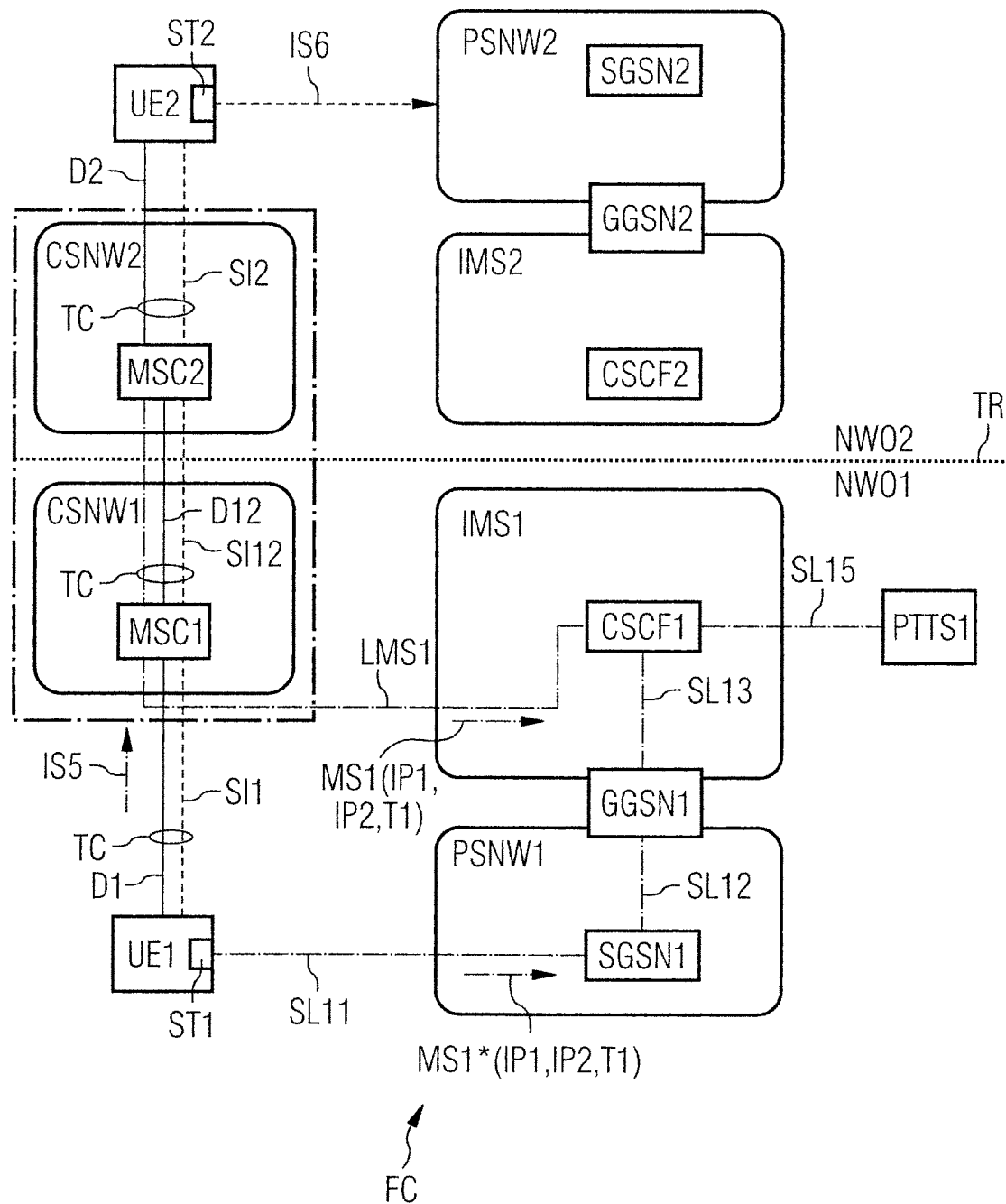
FIG. 3 shows a schematic illustration of the required circuit-oriented telephone connection as a new, second communication connection between the two radio communication appliances shown in FIG. 2 after the PTT session has been cleared down or terminated, FIGS. 4 and 5 each show a schematic illustration of the interchange of notification and control signals via the radio interfaces of the two radio communication appliances shown in FIG. 1 in order to initiate the latter's changing from the existing, packet-oriented PTT session to the circuit-oriented telephone connection.

In the next step, the PTT session PC is cleared down immediately after activation or possibly not until after setup of the circuit-oriented telephone connection TC. This state is shown in FIG. 3. There, the two radio communication appliances UE1, UE2 no longer have communication connections to the components of the packet-oriented network part or to the PTT server PTTS1.

It goes without saying that the change from the packet-oriented PTT session PC to the circuit-oriented telephone connection TC can also be initiated and made by the second radio communication appliance UE2 in a corresponding manner.

To be able to generate a respective control or notification signal for the change from the communication connection type PTT service to the circuit-oriented telephone connection (and vice versa), the respective radio communication appliance UE1 or UE2 has a control unit ST1 or ST2. Preferably, the user of the respective radio communication appliance is provided with an associated selection procedure in the latter's control menu in order to be able to address the control unit in his radio communication appliance.

As a generalization, changing from the packet-oriented PTT session PC to the circuit-oriented telephone connection TC involves one or more address parameters for at least one radio communication appliance connected to the PTT session and/or at least one PTT session identification parameter being sent to the control unit which is responsible for the circuit-oriented telephone connection using at least one control signal. Such address parameters are formed, in particular, by the telephone numbers PN1, PN2 of the respective connected radio communication appliance. In the exemplary embodiment shown in FIG. 1, the PTT server PTTS1, as control unit for the PTT session PC, in this case uses the signaling connection LSM11 to transmit, by way of example, the telephone numbers PN1, PN2 of the two radio communication appliances UE1, UE2 and also the identification parameter P1 to the control unit MSC1 in the control signal SM1.

If, conversely, a circuit-oriented telephone connection TC has already been set up between the two radio communication appliances UE1, UE2, and if one of these radio communication appliances UE1, UE2 now wishes to change to a PTT session PC, then one or more address parameters for at least one radio communication appliance UE1, UE2 connected to the circuit-oriented telephone connection TC and also an identification parameter T1 as an explicit identifier for the circuit-oriented telephone connection are likewise sent, using at least one control signal, to the PTT server PTTS1 as control unit which is responsible for the packet-oriented PTT session PC. Such a control signal can be generated, in particular, by that control unit which is responsible for the circuit-oriented telephone connection TC, and can be transmitted directly to the control unit which is responsible for the packet-oriented PTT session PC. FIG. 3 additionally shows in a dash-dot line that, by way of example, the switching unit MSC1, which is associated with the first radio communication appliance UE1, uses a signaling connection LMS1 to send a control signal MS1 (IP1, IP2, T1) via the CSCF component CSCF1 in the "IP multimedia subsystem" IMS1 directly to the PTT server PTTS1. This control signal MS1 contains, in particular, the IP or SIP addresses IP1, IP2 of the radio communication appliances UE1, UE2 connected to the circuit-oriented telephone connection TC and also the identification parameter T1 for the already existing telephone connection TC. The addresses IP1, IP2 of the two radio communication appliances UE1, UE2 for the required, packet-oriented PTT service connection setup are either already known to the switching unit MSC1 from a previous PTT session, or the switching unit MSC1 has previously polled the two radio communication appliances UE1, UE2 for these addresses. If appropriate, the respective radio communication appliance wishing to change to the PTT session automatically sends its own packet-oriented address (for the PTT session) and that of the requested interlocutor, or forms these from the telephone numbers which are known to it, particularly in the form of URI (uniform resource identifier) addresses. In this case, the packet-oriented address of the interlocutor may also be polled using a request signal from that radio communication appliance which is activating the change from the circuit-oriented telecommunication connection to the packet-oriented PTT session. This check may be performed, if appropriate, by the network-allocated switching or control unit which is associated with that radio communication appliance which wishes to change from the telephone connection to the PTT session.

As an alternative to control of the change from the circuit-oriented telephone connection TC to the packet-oriented PTT session PC by that control unit which is responsible for the circuit-oriented telephone connection TC, one preferred variant allows that radio communication appliance which is requesting this change to transmit a corresponding control signal to the PTT server directly as well. In FIG. 3, the first radio communication appliance UE1 transmits such a direct control signal MS1*, which contains the address parameters IP1, IP2 and also the identification parameter T1, to the PTT server PTTS1 via the components SGSN1, GGSN1, CSCF1. In this case, the control signal MS1* with the address parameters IP1, IP2 and also with the identification parameter T1 is generated by the control unit ST1 in the radio communication appliance UE1, that is to say that the radio communication appliance UE1 fully controls the change from the circuit-oriented telephone connection TC, which has already been set up, to the packet-oriented PTT session PC. If appropriate, the control unit ST1 can also check the second radio communication appliance UE2 or the latter's responsible switching unit MSC2 for the address parameter IP2 using the already existing telephone connection TC, or can generate said address parameter from the telephone number PN2 known or sent to it.

Alternatively, on the basis of the control signal MS1*, the PTT server instead of the radio communication appliance UE1 can preferably fully control the change from the circuit-oriented telephone connection TC, which has already been set up, to the packet-oriented PTT session PC. For this purpose, it has a control unit SVS (see FIG. 1). The first radio communication appliance UE1 thus uses the control signal MS1* directly to signal to the PTT server PTTS1 its need to change to a specific PTT service. The PTT server PTTS1 then takes over control of the further steps for changing.

In summary, a change is made from a first communication connection, which has been set up, to a second communication connection under the control of at least one radio communication appliance connected to the first communication connection and/or at least one control unit (connected to the radio network in the radio communication system) connected to the first communication connection by activating the second communication connection while the first communication connection still exists.

This allows a largely seamless changeover
1. from a PTT session to a telephone connection, and/or
2. from a telephone connection to a PTT session for the user of the respective connected radio communication appliance.
In principle, two solution variants are distinguished in this context:
A—a user-equipment controlled solution and
B—a network controlled solution.
1. Changeover from a PTT Session to a Telephone Connection:

In a first initial situation, a PTT session has already been set up between two radio communication appliances, such as UE1, UE2 shown in FIG. 1, that is to say that there is both signaling processing and useful data processing on an IP basis between these two radio communication appliances. The users of the two radio communication appliances now wish to change as seamlessly as possible from the PTT session to a normal telephone connection in the PSTN-CS (Public Switched Telephone Network—Circuit Switched) domain, that is to say in the circuit-oriented part of the radio network.
1.A User-Equipment Controlled Solution:

"User-equipment (UE) controlled solution" means that that radio communication appliance initiating the change also has and maintains control over the change. In the exemplary embodiments below, this is always the first radio communication appliance UE1 (see FIG. 1). Starting from the basic principle, this first radio communication appliance UE1 now sets up a telephone connection via the PSTN-CS (Public Switched Telephone Network—Circuit Switched) network, that is to say via the circuit-oriented part of the radio network, to the second radio communication appliance UE2 independently of the PTT session. The second radio communication appliance can either take this call automatically or can notify its user of this call in a manner which can be chosen by the user. By way of example, the need for the user of the first radio communication appliance to change can be indicated to the user of the second radio communication appliance visually or audibly. In particular, the identification parameter P1 which is sent indicates to the user of the second radio communication appliance that the call is part of the PTT session PC already in progress and is not a further call with no relation to the PTT session PC. When the telephone connection has been set up, all the voice data are now routed via the PSTN-CS_based telephone connection instead of via the IP_based PTT session. The PTT session can then be automatically terminated immediately, for example by the first radio communication appliance UE1, or only after a certain period of time, such as after 5 minutes. Alternatively, however, it may also continue to be maintained in parallel until the communication between the first and second radio communication appliances UE1, UE2 is terminated finally. Holding the PTT session and simultaneously the telephone connection between the two radio communication appliances UE1, UE2 in parallel makes it possible to change quickly again from the telephone connection to the PTT session at any time, i.e. it is possible to switch flexibly forward and back without the need for completely setting up the respective requested communication connection again.
1.B Network Controlled Solution:

"Network controlled solution" means that the PTT server, such as PTTS1 in FIG. 1, which is used to run the PTT session has control over the change instead of a participating radio communication appliance, as in the variant embodiment 1.A. For this network controlled solution, that radio communication appliance, such as UE1, which wishes to change from the PTT session to the telephone connection signals this need to change, using a notification signal, such as IS2 (see FIG. 1) and IS2*, to the PTT server, such as PTTS1 in FIG. 1. The PTT server then uses a control signal, such as SM1, to signal to the switching unit MSC1 which is responsible for the first radio communication appliance UE1 in the PSTN-CS domain that a telephone connection needs to be set up between the first and second radio communication appliances UE1, UE2. The switching unit MSC1 then starts appropriate activities for setting up the telephone connection. In this case, the radio communication appliances UE1, UE2 can take their respective incoming call, in particular automatically. Alternatively, the respective call may also not be taken until after active acknowledgement by the user of the respective radio communication appliance. As soon as the telephone connection has been made, all voice data are now routed via the PSTN-CS_based telephone connection instead of via the IP_based PTT session. If appropriate, the switching unit which is responsible for the telephone connection, such as MSC1 in this case, signals to the PTT server that the telephone connection has been successfully set up. As in example 1.A, the PTT session may then be terminated immediately by the PTT server PTTS1 if appropriate.
2. Changeover from a Telephone Connection to a PTT Session:

In a second initial situation, a normal telephone connection in the PSTN-CS domain has now been set up between the two radio communication appliances UE1, UE2. The two users of the radio communication appliances UE1, UE2 wish to change from this telephone connection to an IP_based PTT session as seamlessly as possible.

2.A User-Equipment Controlled Solution:

In this context, one of the radio communication appliances connected to the telephone connection again has control over the change. In the present exemplary embodiment, this is the first radio communication appliance UE1. In parallel with the existing telephone connection TC, this radio communication appliance UE1 initiating the change sets up a PTT session PC. As soon as the PTT session is active, all voice data are sent via the PTT session instead of via the telephone connection. The telephone connection is then terminated by the first radio communication appliance UE1 or is maintained in parallel therewith for a required period of time.

2.B Network Controlled Solution:

In this context, that control unit in the radio network which is responsible for the telephone connection has control over the change to the PTT session. This network-end control unit is preferably formed by that switching unit, such as MSC1 (see FIG. 1), which is associated with the radio communication appliance, such as UE1, which has the need to change. The radio communication appliance UE1 uses a notification signal IS5, which is shown additionally by a dash-dot line in FIG. 3, to signal to its network-allocated switching unit MSC1 that a change to the PTT session PC is wanted. The switching unit MSC1 then uses the control signal MS1, for example, to signal to the appropriate PTT server that it needs to set up a PTT session between the two radio communication appliances UE1, UE2. The PTT server PTTS1 then starts appropriate activities. In particular, it transmits to the two radio communication appliances UE1, UE2 corresponding request signals, for which the radio communication appliances UE1, UE2 can take the PTT session, in particular automatically. These request signals from the PTT server have been omitted in FIG. 3 for the sake of clarity of the drawing. In particular, the user of the respective receiving radio communication appliance can also actively acknowledge the respective incoming request signal for setting up a PTT session by returning a corresponding response signal to the PTT server. As soon as the PTT session is running, all voice data are now routed via the PTT session instead of via the telephone connection. Preferably, the PTT server signals to the switching unit MSC1 that the PTT session has been successfully set up. The telephone connection may then be terminated immediately by the switching unit MSC1 if appropriate, or may be maintained in parallel if a later, fast return to the telephone connection by the user is not yet ultimately out of the question.

The network-end control unit which has control over the change to the PTT session is alternatively formed by the PTT server PTTS1 associated with the radio communication appliance UE1. The radio communication appliance UE1 uses the control or notification signal MS1*(which is shown additionally in the form of a dash-dot line in FIG. 3) to signal to its network-allocated PTT server PTTS1 that a change is required from the existing circuit-oriented telephone connection TC to the PTT session PC. The PTT server PTTS1 then starts appropriate activities, whose further progression has already been explained previously, particularly in the previous paragraph.

The fact that a second communication connection is activated while a first communication connection which has already been set up between at least two connected radio communication appliances still exists allows the users of the services "PTT" and "telephony" to change between these two services in each case without any great complexity and also without interrupting the communication between them. Thus, depending on the current need for communication and the present communication situation, it is possible to use that service which is currently considered to be more agreeable or more advantageous by the users. A particular advantage of the user-equipment controlled solution is that no complex or additional functionalities are required in the radio network for the purpose of implementation. A particular advantage of the network-controlled implementation is that the network elements which have a service's logic and also control the resource and cost outlay, that is to say in this case the switching units MSC1, MSC2 and also the PTT server PTTS1, for example, also have technical control over a service change. In the case of this variant, it is then even possible for a service change to be initiated by the network. In that case, it is not necessary for the radio communication appliances connected to be additionally provided with complex control means. Instead, it is possible to use already existing radio communication appliances.

So that it is possible to change from the first communication connection type to the second communication connection type satisfactorily, that is to say largely without interruption, the user equipment controlled solution preferably involves the user identity in a respective connected radio communication appliance, such as telephone number and/or SIP address, being transferred from one application, such as PTT to the respective other, such as telephony. It is also expedient to extend the signaling about communication of the need to change when additionally setting up the telephone connection or the PTT session such that the respective radio communication appliance at the other end automatically needs to accept the call or the PTT session. In that case, the additional communication connection is implemented in parallel with the existing communication connection without any additional intervention by the user at the other end. In order to be able to produce the association with the first communication connection type when setting up the second communication connection type, and for this association to be explicit, the signaling operations advantageously involve, in addition, an identification parameter, such as T1, which clearly identifies the already existing first communication connection, being concomitantly delivered in the control signal in the respective radio communication appliance with the need to change or in the control signal in the control unit which is responsible for the already existing communication connection on the network.

In the case of the network controlled solution, the radio communication appliance initiating the change, such as UE1, transmits a corresponding notification signal to the switching unit which is responsible for it on the network, such as MSC1, when a change is required from the PTT session to the telephone connection, and also to the PTT server, such as PTTS1, when a change is required from the telephone connection to the PTT session. In response to such a request signal, the appropriate switching unit, such as MSC1, sends a control signal, such as MS1, to that control unit, such as the PTT server PTTS1 in this case, which is responsible for the circuit-oriented telephone connection in the event of the need to change from the packet-oriented PTT session to the circuit-oriented telephone connection. Changing from the packet-oriented PTT session to the circuit-oriented telephone connection involves the PTT server, such as PTTS1, sending at least one control signal, such as SM1, to that control unit in the radio network which is responsible for the circuit-oriented telephone connection. In this context, this control unit is formed, in particular, by that switching unit, such as MSC1, which is responsible for that radio communication appliance which initiates the change from the packet-oriented PTT session to the circuit-oriented telephone connection. To acknowledge that a call or a PTT session has been set up successfully, it may possibly be expedient to acknowledge the respectively sent notification signal or control signal in the opposite direction using a response signal.

In practice, the following variant embodiments can advantageously be implemented, in particular:

Example 1 for the User-Equipment Controlled Solution of 1.A

The starting point is a PTT session between the two radio communication appliances UE1, UE2, for which connection setup using the PTT server PTTS1 is denoted by PC in FIG. 1. As the communication between the users of the two radio communication appliances UE1, UE2 turns into a discussion, they wish to change from the PTT session PC to a normal telephone connection TC in line with FIG. 2. To this end, the PTT menu on the respective radio communication appliance provides the "Change to telephony" function, which the user of the first radio communication appliance UE1 selects in the present exemplary embodiment. Within the first radio communication appliance UE1, its PTT application (e.g. a PTT client) then calls up the telephony application, e.g. using the PTT partner's telephone number, i.e. in this case using the telephone number of the second radio communication appliance UE2, as a transfer parameter. The first radio communication appliance UE1 then starts a call request IS1 Co the circuit-oriented part of the radio network which is responsible for setting up telephone connections. This is called the PSTN-CS domain. The call request IS1 then arrives at the second radio communication appliance and is signaled to its user accordingly. Thus, the user of the second radio communication appliance can be made aware, for example using a ringtone, that the first radio communication appliance wishes to change from the PTT service to the normal telephone connection. If the user of the second radio communication appliance UE2 accepts the call IS1, for example by returning an acknowledgement or response signal RIS1 to the first radio communication appliance via the switching units MSC1, MSC2, then the telephony application in the first radio communication appliance UE1 provides the PTT application with the response that a telephone connection has been successfully set up. This state is shown in FIG. 2. There, the telephone connection is denoted by TC. It is maintained in parallel with or in addition to the PTT session between the two radio communication appliances UE1, UE2. When this telephone connection TC between the two radio communication appliances UE1, UE2 has been made available, all voice data are sent via this telephone connection TC in the PSTN-CS domain in both directions of transmission, specifically regardless of whether or not a user has currently activated the PTT key on his radio communication appliance. In other words, this means that the voice connection via the PTT server PTTS1 shown in FIG. 2 then no longer exists, but rather now only the communication connection via the switching units MSC1, MSC2 which are responsible on the network. The PTT application in the first radio communication appliance UE1, from which the need to change issued, can then terminate the PTT session PC immediately or after a particular, settable period of time. To this end, it transmits the SIP message "BYE" to the appropriate PTT server. This state is shown in FIG. 3, where now only the telephone connection TC is maintained between the two radio communication appliances UE1, UE2. Alternatively, it may possibly be expedient to continue to maintain the PTT session PC in parallel with the telephone connection TC as well, in order to be able to implement a change back to the PTT session PC, which may possibly be required later, more quickly. This is advantageous, for example, if the discussion between the users of the two radio communication appliances UE1, UE2 has ended and voice messages are being sent again only sporadically, i.e. singularly.

To achieve a change of service as far as possible without any interruption in the communication between the two radio communication appliances UE1, UE2, it can be advantageous, in particular, for the second radio communication appliance UE2 to take the call request IS1 from the first radio communication appliance UE1 automatically. The user Of the second radio communication appliance UE2 is thus not informed about the call IS1 by means of a ringtone, and also does not need to take this call IS1. In this regard, it is expedient for a distinguishing parameter, particularly a "FLAG", "Take call automatically" or "Call takes over active PTT session" to be inserted into the notification signal IS1 upon the call request from the first radio communication appliance UE1, so that the second radio communication appliance UE2 takes the call automatically on the basis of such a distinguishing parameter. Alternatively or else additionally, the second radio communication appliance UE2 can use the notification signal IS1 to check for the call request whether a PTT session is already active with the same user, i.e. with his associated telephone number. Only if this is the case is the call taken automatically. Alternatively or else in addition, an identification parameter, such as P1, which clearly identifies the active PTT session can be additionally delivered in the call request with particular advantage so that the circuit-oriented telephone connection which has been set up again can be clearly associated with the existing PTT session.

Example 2 for the User-Equipment Controlled Solution 1.A

As an alternative to the telephone call setup at the start of example 1, it is also possible for activation of the "Change to telephony" function in the first radio communication appliance UE1 to be followed by transmission of an "SIP" (Session Initiation Protocol) message to the PTT server PTTS1, which then sends a corresponding SIP message PTTS1 to the second radio communication appliance UE2. This notification signal is shown additionally by a dash-dot line in FIG. 1 and is denoted by IS2. This SIP message contains a request to change to a telephone connection in the PSTN-CS domain. Examples of SIP messages which can be used for this purpose are "reinvite" or "info", by adding thereto a new header, i.e. a new header field such as "application-change: CS telephony", and/or by inserting an appropriate SDP (Session Description Protocol) message in the data part or body of the SIP Message. It may possibly be expedient for the first radio communication appliance UE1 also to enter its telephone number PN1 into the SIP message IS2. As a positive response to this notification signal IS2, the second radio communication appliance can return an SIP message RIS2 to the first radio communication appliance UE1. In this case, it may be expedient for the second radio communication appliance UE2 also to insert its telephone number PN2 into the response signal or acknowledgement signal RIS2. There are thus two alternatives for setting up a telephone connection between the two radio communication appliances UE1, UE2. These are shown schematically in FIGS. 4 and 5.

In the first variant, shown in FIG. 4, the radio communication appliance UE1 transmits the notification signal IS2 to the second radio communication appliance UE2 using the mediation of the PTT server PTTS1. The second radio communication appliance accepts the call request and returns the acknowledgement signal RIS2, specifying his telephone number PN2, to the first radio communication appliance UE1 via the PTT server PTTS1. Following receipt of the acknowledgement signal RIS2 named "200 OKAY (PN2)", the first radio communication appliance UE1 then starts call setup using a procedure STC, since it now knows the telephone number PN2 of the interlocutor. In this case, UE1 sends the telephone number PN2 of the second radio communication appliance UE2 to the switching unit MSC1 which is responsible on the network as an address parameter.

In the variant shown in FIG. 5, the first radio communication appliance UE1, whose user needs to change to the telephone connection TC, delivers its telephone number PN1 to the second radio communication appliance UE2 in the notification signal IS2. In this case, the notification signal IS2 is likewise sent via the existing signaling and/or data connections for the PTT session which has already been set up. This is indicated in FIG. 5 by virtue of its showing the PTT server PTTS1 between the interfaces on the two radio communication appliances UE1, UE2 by means of a dashed rectangle with an associated interface line. Following this notification signal IS2, the second radio communication appliance UE2 returns the response signal RIS2 to the first radio communication appliance UE1 under the mediation of the PTT server PTTS1 without indicating its telephone number. Next, the second radio communication appliance starts call setup by activating the procedure STC. Unlike the variant shown in FIG. 4, the second radio communication appliance UE2 thus sets up the call in this case instead of the first radio communication appliance UE1. For this, it transmits to its switching unit MSC2 with responsibility on the network the call number PN1 of the first radio communication appliance UE1, which is transmitted in the notification signal IS2.

The telephone number PN2 or PN1 which is also delivered in the respective SIP message, such as RIS2 in FIG. 4 and IS2 in FIG. 5, may possibly be required by the respective receiver of the SIP message for call setup. This is because, since the signaling of PTT session is SIP_based, it may be that the radio communication appliance which needs to change to the telephone connection does not actually know the telephone number of the other connected radio communication appliances. This is because, for a PTT session, user addressing merely using SIP addresses and not using telephone numbers may actually be sufficient.

In this example 2, the called party can advantageously take calls automatically, since the called user end knows from the preceding SIP signaling that the call request is part of the needed change from the PTT session to the telephone connection. For this, an identification parameter, such as P1, may possibly be additionally delivered in the call request as well.

Example 3 for the Network Controlled Solution of 1.B

In this case too, the user of the first radio communication appliance UE1 activates the "Change to telephony" function in his PTT menu. The first radio communication appliance UE1 then signals to the PTT server PTTS1 that a change of service from PTT to telephony is wanted. To this end, it transmits the notification signal IS2*(see FIG. 1), specifying its own telephone number PN1 and also the telephone number PN2 of the connected second radio communication appliance UE2, to the PTT server PTTS1. For this notification signal IS2*, the SIP format is preferably used. In the interface diagram shown in FIG. 6, this message bears the label "1: INFO (PN1, PN2)". To be able to indicate to the second radio communication appliance UE2 the need to change from PTT to telephony, it may be expedient to add to the notification signal IS2 a corresponding header, such as one named "Application-change: CS telephony" and/or to deliver a corresponding SDP (Session Description Protocol) message at the same time in the body of the SIP message. When the first radio communication appliance UE1 has received an acknowledgement signal RIS2* back from the PTT server PTTS1 in response to the request signal IS2*, the PTT server PTTS1 in the packet switched domain, i.e. in the packet-oriented part of the radio network, signals to the switching unit MSC1 which is responsible for the first radio communication appliance UE1 in the PSCN/CS domain of the radio network that the first radio communication appliance UE1 needs to change to a telephony connection between the two radio communication appliances UE1, UE2. To this end, said PTT server transmits a notification signal R2 to the CSCF component CSCF1 (see FIG. 1), which sends a notification signal R3 to the MGCF component MGCF1 under the mediation of a BGCF (Breakout Gateway Control Function) component BGCF1. Said MGCF component in turn sends a notification signal R4 to the SGW component SGW1, which finally sends a notification signal SU5 named "5: set up (PM1, PM2)" to the switching unit MSC1. In this case, the individual notification signals R2, R3, R4 and SU5 act as a control signal, when considered together. This control signal is shown additionally by a dash-dot line in FIG. 6 and is denoted by SM1. It contains the telephone numbers PN1, PN2 as address parameters. This sending of one or more address parameters for at least one radio communication appliance connected to the PTT session using at least one control signal to the control unit which is responsible for the circuit-oriented telephone connection is shown in detail in FIG. 7. Following receipt of the notification signal IS2* about the need for the radio communication appliance UE1 to change, the PTT server PTTS1 transmits the control signal SM1 to the switching unit MSC1, as control unit for the circuit-oriented telephone connection, with communication of the telephone numbers PN1, PN2 of the two radio communication appliances UE1, UE2 via the CSCF (Call State Control Function) component CSCF1, the MGCF (Medium Gateway Control Function) component MGCF1 and the SGW (Signaling Gateway) component SGW1. The message signal chain R6, R7, R8 through the individual components SGW1, MGCF1, CSCF1 is used to acknowledge to the PTT server PTTS1 that the request for call setup has arrived at the switching unit MSC1. The BGCF component BGCF1 has the function of finding out the appropriate MGCF component MGCF1 for the CSCF component CSCF1, the functionality of said MGCF component not being considered in more detail here within the scope of the invention. The MGCF component MGCF1 is responsible, in particular, for interworking, i.e. cooperation between the PS domain and the PSTN/CS domain. The SGW component SGW1 has, in particular, the function of connecting the SCFP/IP (Simple Control Frameport Protocol/Internet Protocol) based signaling network in the PS domain and the SS7 signaling network in the PSTN/CS domain. More details in this regard can be found in the specification 3GPP TS 23.228 V5.11 "IP Multimedia Subsystem (IMS); Stage 2".

The switching unit MSC1 can now use its "network-initiated call" function to set up a telephone connection between the two radio communication appliances UE1, UE2. This procedure is specified in detail particularly in part 5.2.3 of the specification 3GPP TS 24.008 V5.10 "Mobile radio interface Layer 3 specification; Core network protocols; Stage 3".

Figure 6:
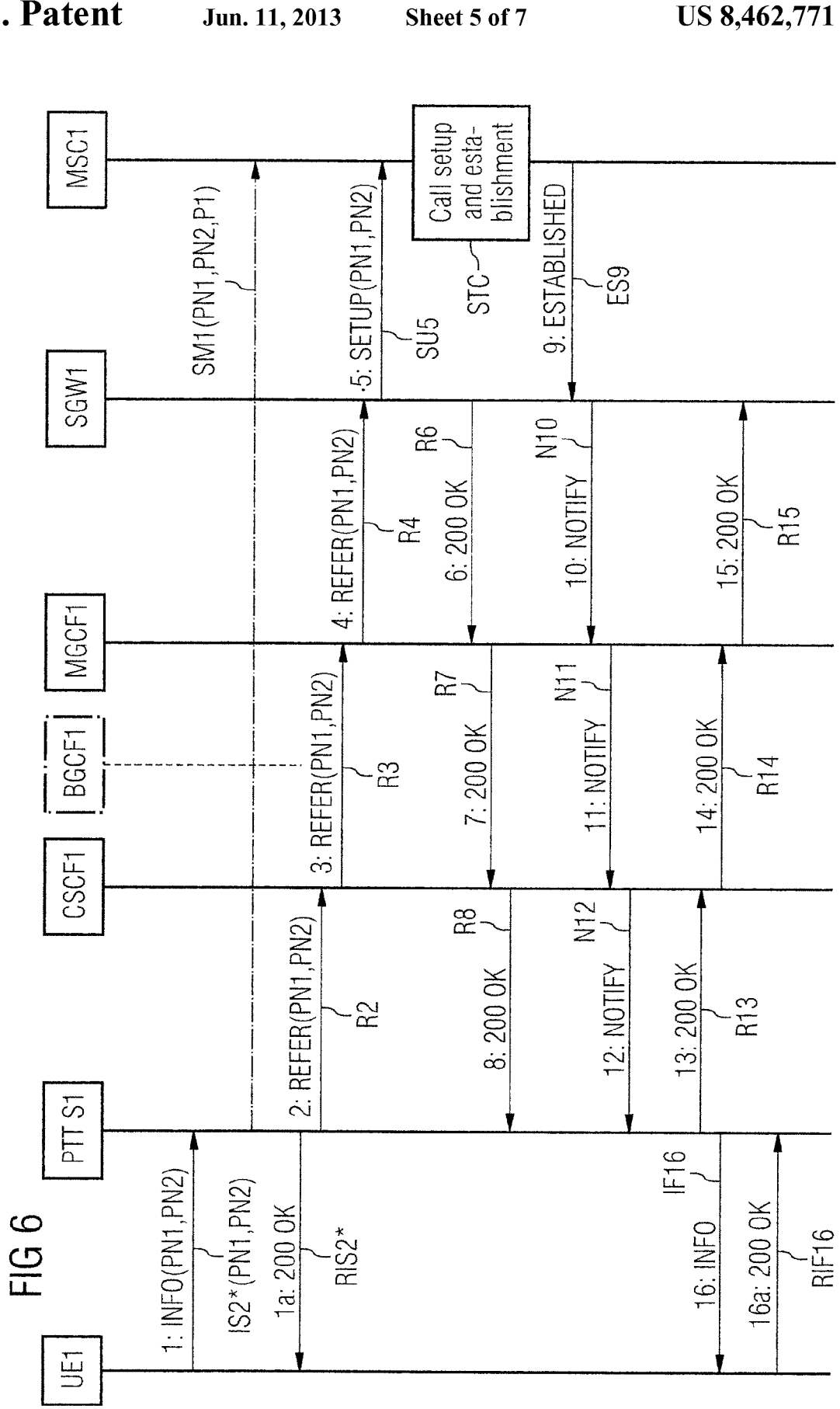
FIG. 6 shows a schematic illustration of the signaling flow of information and control signals between components in the radio network shown in FIG. 1 and the radio communication appliance which has the need to change from the PTT session to the circuit-oriented telephone connection, in order to perform a further variant of the inventive method.
Figure 7:
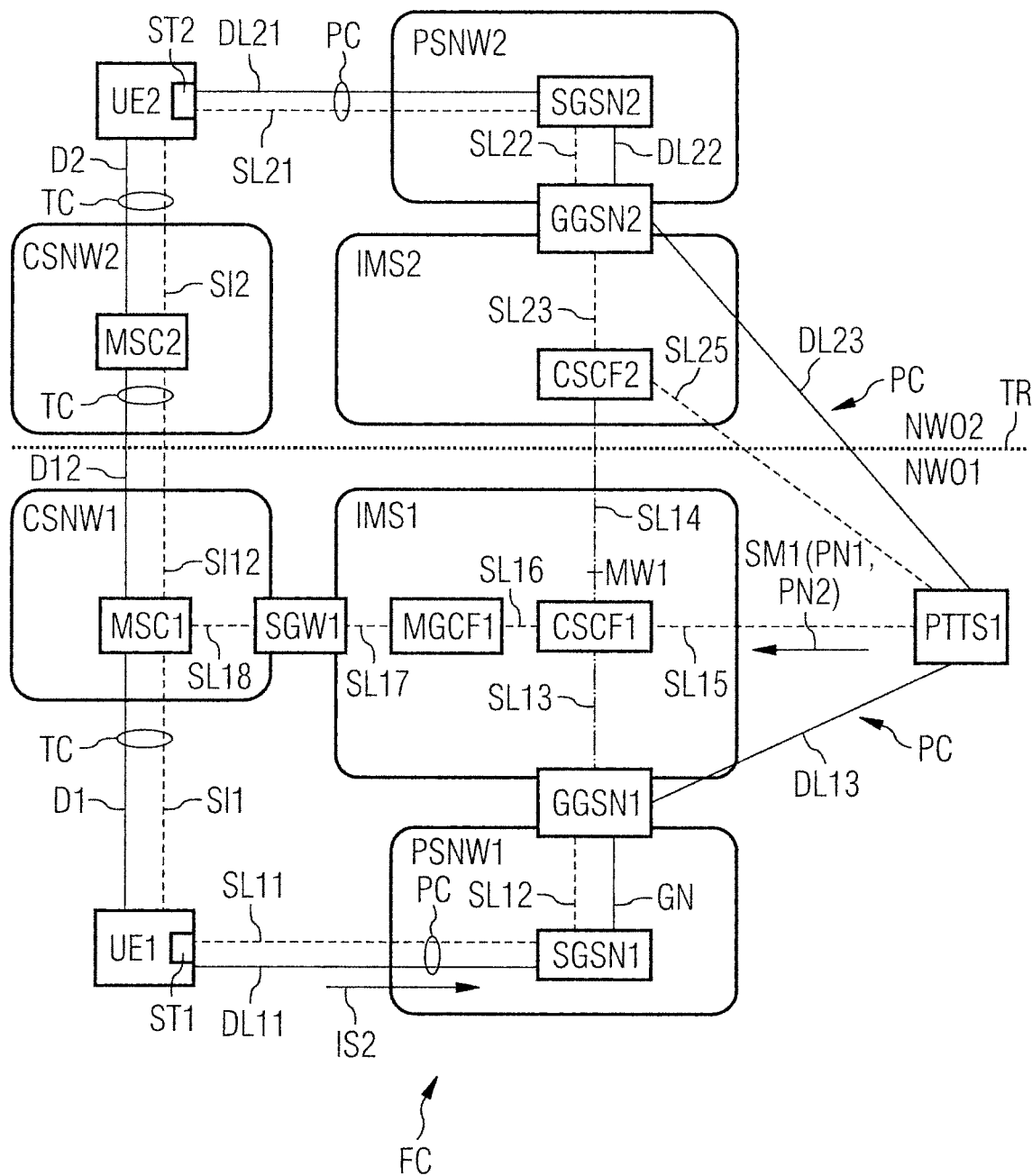
FIG. 7 shows a schematic illustration of components of the network architecture shown in FIG. 1 and FIG. 2 for changing from a packet-oriented PTT session to a circuit-oriented telephone connection between two connected radio communication appliances, where a further variant of the inventive method is used to control the changeover between these two communication connection types by a control unit for the PTT service.

The activation of call setup by the switching unit MSC1 is denoted by STC in FIG. 6. The switching unit MSC1 uses this activation procedure STC to start a call request to the second radio communication appliance UE2 under the mediation of the latter's appropriate switching unit MSC2. This signaling to the reception-end switching unit MSC2 has been omitted from FIG. 6 for the sake of clarity. The second radio communication appliance can take the call automatically or can ask for explicit acknowledgement from the user of the second radio communication appliance. As soon as the telephone connection is running, all voice data are sent via the telephone connection in the PSTN/CS domain in both directions regardless of whether or not a user of the connected radio communication appliances UE1, UE2 has just activated the PTT key. In addition, the switching unit MSC1 uses acknowledgement signals ES9, N10, N11, N12, with the involvement of the components SGW1, MGCF1, CSCF1, to signal to the PTT server PTTS1 that the telephone connection has been successfully set up. This is acknowledged by the PTT server PTTS1 by returning the acknowledgement signal chain R13, R14, R15 to the SGW component SGW1. Finally, the PTT server PTTS1 uses a response signal IF16 to inform the first radio communication appliance UE1 that the request to change from PTT to telephony has been performed successfully. The radio communication appliance UE1 responds to this notification signal IF16 with the response signal RIF16 to the PTT server PTTS1. The PTT server is then able to terminate the PTT session immediately or after a particular settable period of time by transmitting the SIP message named "BYE" to the radio communication appliances UE1, UE2. To be able to implement any later change back to the PTT session more quickly, however, the PTT session may possibly also continue to be maintained in parallel with the telephone connection.

Example 4 for the User-Equipment Controlled Solution 2.A

The signal flow in this variant embodiment is similar to that for example 1, only that in this case the change is made in the opposite direction, namely from a telephone connection to a PTT session. The starting point in this case is now a telephone connection between the two radio communication appliances UE1, UE2, as shown in FIG. 3. Since the communication between the users of the two radio communication appliances is now only sporadic, the radio communication appliance's wish to change from the telephone connection TC to the PTT session PC. To this end, the telephone menu on the respective radio communication appliance provides the function "Change to PTT session". In the present exemplary embodiment, the user of the first radio communication appliance UE1 selects this menu item. Next, the telephony application within the first radio communication appliance UE1 calls up the PTT application, e.g. a PTT client, particularly with the telephone number PN2 of the telephony partner, that is to say in this case the telephone number of the second radio communication appliance UE2, as a transfer parameter. The transfer parameter then starts a PTT request in the packet switched domain via the "IP multimedia subsystem" (IMS), e.g. with an invite message in the known manner. To this end, the control means ST2 in the second radio communication appliance UE2 is used to send a notification signal IS6 to the appropriate components in the packet-oriented network part. This notification signal IS6 is indicated by a dash-dot line in FIG. 3. When the PTT session is established, the PTT application gives the telephony application the response that this PTT session has been successfully set up. In this case, the setup and the sequence of the PTT session are controlled by the PTT server PTTS1, in particular. Following successful setup of the PTT session, the telephone connection is then terminated or cut by the first radio communication appliance UE1, which originally had the need to change. From this point on, voice data are now sent only via the PTT session in the PS domain when a user has just activated the PTT key, i.e. now only the PTT session is active.

Example 5 for the User-Equipment Controlled Solution 2.A

As a modification to example 4, in this case the PTT session is maintained in parallel, i.e. simultaneously, with the new telephone connection which has been set up. It is then possible to change back and forth between the two services almost fluently, i.e. without interruption. If, by way of example, the telephone connection between the users on the two radio communication appliances UE1, UE2 has been activated for communication and it is now necessary to change to the PTT application, then the telephony application informs only the PTT application that the latter needs to undertake voice transmission again. Following positive acknowledgement from the PTT application to the telephony application, the telephony application then terminates the telephone connection. Unlike in example 4, it is thus not necessary in this case to set up a new PTT session in addition, but rather it is simply possible for the PTT session which still exists and is maintained in parallel to be used actively again.

Example 6 for the Network Controlled Solution of 2.B

Figure 8:
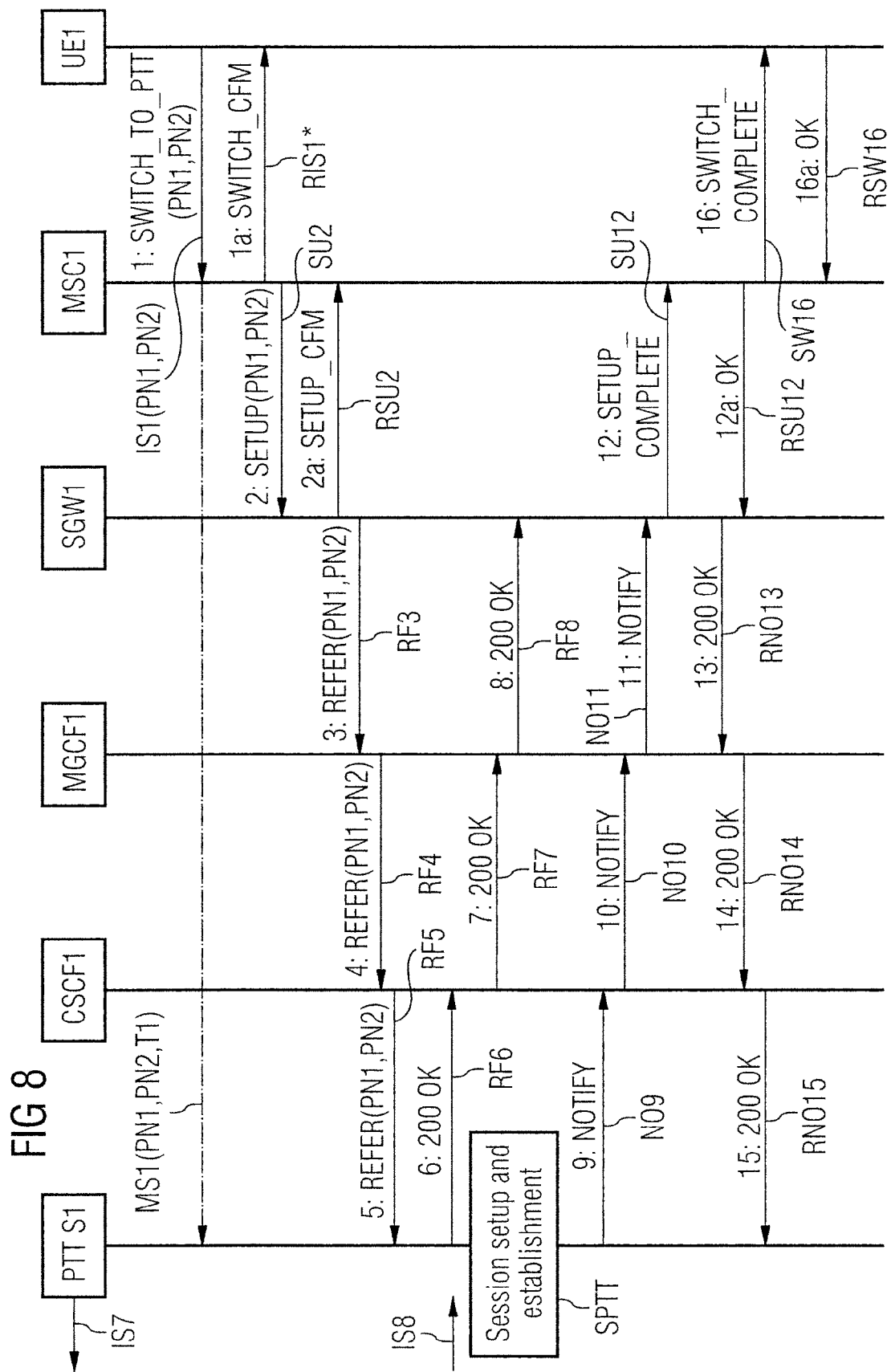
FIG. 8 shows a schematic illustration of the signal flow between the network components in the radio network architecture shown in FIG. 1 and FIG. 2, from which the need to change from the latter's previously circuit-oriented telephone connection to a packet-oriented PTT session using a further variant of the inventive method issues.

This variant embodiment corresponds to the method sequence from example 3, but with the difference that the change is made in the opposite direction in example 6, namely from a telephone connection to a PTT session. The starting point in this case is the telephone connection TC between the two radio communication appliances UE1, UE2, as illustrated in FIG. 3. In this case too, the user of the first radio communication appliance UE1 activates the function "Change to PTT session" in his telephony menu. The subsequent signal flow between the first radio communication appliance UE1 and the connected network components is depicted in FIG. 8 in this case. The first radio communication appliance UE1 uses a control or notification signal IS1 to signal to its appropriate switching unit MSC1 that a change of service from telephony to PTT is needed. This notification signal IS1 simultaneously contains the two telephone numbers PN1, PN2 of the two radio communication appliances UE1, UE2. This notification signal IS1 has the label "1: Switch to PTT (PN1, PN2)" in FIG. 8. The switching unit MSC1 uses a notification signal SU2 to inform the SGW component SGW1 about the need for the first radio communication appliance UE1 to change. This SGW component SGW1 then transmits a notification signal RF3 to the MGCF component MGCF1, which in turn informs the CSCF1 component using an information signal RF4. Finally, the CSCF component CSCF1 transmits a notification signal RF5 to the PTT server PTTS1, and the latter is also notified of the two telephone numbers PN1, PN2. In this way, the switching unit MSC1 sends one or more address parameters for at least one radio communication appliance connected to the circuit-oriented telephone connection to that control unit which is responsible for the packet-oriented PTT session using at least one control signal. In the present exemplary embodiment, this control signal is formed by the chain of single signals SU2, RF3, RF4, RF5. It is shown additionally in FIG. 8 by a dash-dot line and is provided with the reference symbol MS1. The switching unit MSC1 expediently adds to the control signal MS1 the identification parameter T1, which distinguishes the already existing telephone connection TC and actually makes clear association with the required PTT session possible for the first time, which means that confusion with other PTT sessions or telephone connections is avoided. The notification signal IS1 is acknowledged to the first radio communication appliance UE1 by the switching unit MSC1 using an acknowledgement signal RIS1*. Receipt of the control signal MS1 is acknowledged to the CSCF component CSCF1 by the PTT server PTTS1 using a response signal RF6. Said CSCF component transmits an acknowledgement signal RF7 to the MGCF component MGCF1, which in turn sends an acknowledgement signal RF8 to the SGW component SGW1. On the basis of the control signal MS1, the PTT server then sets up a PTT session between the two connected radio communication appliances UE1, UE2. This activation of the PTT session is denoted by SPTT in FIG. 8. As soon as the PTT session is running, voice data are sent via the PTT session in the PS domain in one direction only. In that case, only that user who is currently holding the PTT key activated on his radio communication appliance has authorization to speak. The PTT server PTTS1 uses an information signal IS7 to inform the second radio communication appliance UE2 with the aid of accordingly appropriate PS domain network components. In this case, the second radio communication appliance can take this request signal IS7 automatically. Similarly, it may be expedient for the user of the second radio communication appliance UE2 to be notified, particularly by audible or visual indication, of the need for the first radio communication appliance UE1 to change. The user can then decide independently whether or not he wishes to accept the need to change. If the second radio communication appliance UE2 takes the need for the first radio communication appliance UE1 to change and signals this to the PTT server PTTS1 using an acknowledgement signal IS8, then said PTT server activates the PTT session using the procedure SPTT. When the PTT server PTTS1 has successfully set up the PTT session, it uses an acknowledgement signal NO9 to signal this to the CSCF component CSCF1, which uses an acknowledgement signal NO10 to forward this to the MGCF1 component. The latter accordingly uses an acknowledgement signal NO11 to inform the SGW component SGW1, which forwards this acknowledgement to the switching unit MSC1 using an acknowledgement signal SU12. If appropriate, the switching unit MSC1 uses an acknowledgement signal SW16 to inform the first radio communication appliance UE1 that the need to change from telephony to PTT has been successfully implemented. The radio communication appliance UE1 then returns an acknowledgement signal RSW16 to the switching unit MSC1. The notification signals NO9, NO10, NO11, SU12 can be acknowledged by corresponding response signals RNO12, RNO13, RNO14, RSU15 which are consecutive in time. Following the change to the PTT service, the switching unit MSC1 can then cut the telephone connection TC. Alternatively, it is also possible to maintain the telephone connection in parallel for a prescribable period of time.

Example 7 for the Network Controlled Solution of 2.B

The starting point in this case is again the telephone connection TC between the two radio communication appliances UE1, UE2, as shown in FIG. 3. In this case too, the user of the first radio communication appliance UE1 activates the function "Change to PTT session" in his telephony menu. The first radio communication appliance UE1 uses a notification signal MS1* to signal to its appropriate PTT server that a change of service from telephony to PTT is needed. This notification signal MS1* simultaneously contains the two telephone numbers PN1, PN2 of the two radio communication appliances UE1, UE2 and an explicit ID (identification) parameter which distinguishes or identifies or marks the circuit-oriented telephone connection which already exists.

Next, the PTT server then sets up a PTT session between the two connected radio communication appliances UE1, UE2. As soon as the PTT session is running, voice data are sent via the PTT session in the PS domain in one direction only. In that case, only that user who is currently holding the PTT key activated on his radio communication appliance has authorization to speak. When the PTT server PTTS1 has successfully set up the PTT session, it uses the CSCF1, MGCF1 and SGW1 to signal this to the switching unit MSC1. If appropriate, the switching unit MSC1 informs the first radio communication appliance UE1 that the need to change from telephony to PTT has been successfully implemented. The radio communication appliance UE1 then returns an acknowledgement signal to the switching unit MSC1. Following the change to the PTT service, the switching unit MSC1 can then cut the telephone connection TC. Alternatively, it is also possible to maintain the telephone connection in parallel for a prescribable period of time.

This provides interlocutors with a convenient way of changing back and forth between a normal telephony connection and the PTT service. In this case, there are two variants for implementation: the first is that the two radio communication appliances control the call setup for changing to the required mode between themselves, without involving network components. While the calling users are still speaking over the communication connection which was set up first, the required second communication connection is set up in parallel. The radio communication appliances then agree amongst themselves when they change. The advantage in this case is that only appropriate control means or control applications are implemented in the connected radio communication appliances in this context, while already existing network components can be used. This means that changes in the network are largely avoided. The other variant is that the network arranges and controls the change when the users press a key. The advantage in this case is that the network resources are utilized in optimum fashion. This makes the change better. The operator can also demand money in addition. However, this involves network components and the connected radio communication appliances interchanging corresponding control signals and notification signals with one another in order to initiate the change. For this, it is expedient to align the standardization of the affected interfaces between the network components and the radio communication appliances.

The invention claimed is:

1. A method for switching between (a) a packet-oriented PTT communication connection between a first radio communication device and a second radio communication device and (b) a circuit-oriented telephone connection between the first and second radio communication devices, comprising:
    establishing a communication session between the first and second radio communication via a first communication connection comprising one of (a) the packet-oriented PTT communication connection between the first and second radio communication devices and (b) the circuit-oriented telephone connection between the first and second radio communication devices,
    during the communication session between the first and second radio communication devices, in response to a change from a first communication situation suitable for the first communication connection to a second communication situation suitable for a second, different communication connection, the first radio communication device initiating a switch from the first communication connection to the second communication connection, the second communication connection comprising the other one of (a) the packet-oriented PTT communication connection between the first and second radio communication devices and (b) the circuit-oriented telephone connection between the first and second radio communication devices, and after the switch, continuing the communication session between the first and second radio communication devices via the second communication connection, wherein the switch from the first communication connection to the second communication connection comprises activating the second communication connection while the first communication connection still exists.

2. The method of claim 1, wherein the first radio communication device uses the first communication connection, which has already been set up, to send the second radio communication device at least one control signal which is used to notify the second radio communication device of a need for the first radio communication device to change from the first communication connection to the second communication connection.

3. The method of claim 1, wherein at least one of the first and the second radio communication device connected to the first communication connection, which has already been set up, sends to a control unit responsible for the first communication connection at least one control signal which is used to notify the control unit of a need for at least one of the first and the second radio communication device to change from the first communication connection to the second communication connection.

4. The method of claim 1, wherein at least one of the first and the second radio communication device connected to the first communication connection, which has already been set up, sends to a control unit responsible for the second communication connection, which needs to be set up, at least one control signal which is used to notify the control unit of a need for at least one of the first and the second radio communication device to change from the first communication connection to the second communication connection.

5. The method of claim 1, wherein a control unit connected to the first communication connection, which has already been set up, sends a control signal relating to a need for at least one of the first and the second radio communication device change to the control unit that is responsible for activating and setting up the second communication connection.

6. The method of claim 2, wherein the control signal includes (a) one or more address parameters for at least one of the first and second radio communication devices and (b) at least one identification parameter for distinguishing the first communication connection, which has already been set up, from the second communication connection, which needs to be set up.

7. The method of claim 6, wherein the identification parameter in the control signal is used to associate the first communication connection, which has already been set up, with the second communication connection, which is yet to be set up, such that an explicit link is established between the first communication connection and the second communication connection.

8. The method of claim 1, wherein the first communication connection, which has been set up, is cleared down and terminated after the second communication connection has been activated.

9. The method of claim 1, wherein, after it has been activated, the second communication connection is set up and maintained in parallel with the first communication connection, which has already been set up.

10. The method of claim 1, wherein a control unit used for the packet-oriented PTT session comprises a PTT server.

11. The method of claim 1, wherein a control unit used for the circuit-oriented telephone connection comprises an MSC switching unit.

12. A radio communication device having a control unit for carrying out the method as claimed in claim 1.

13. A network component having a control unit for carrying out the method as claimed in claim 1.

14. A radio communication system having a first group of network components for selecting and providing a packet-oriented PTT communication connection between a first radio communication device and a second radio communication device and also having a second group of network components for selecting and providing a circuit-oriented telephone connection between the first and second radio communication devices the two groups of network components comprising control systems configured to cooperate to switch between (a) the packet-oriented PTT communication connection between the first and second radio communication devices and (b) the circuit-oriented telephone connection between the first and second radio communication devices by:

establishing a communication session between the first and second radio communication via a first communication connection comprising one of (a) the packet-oriented PTT communication connection between the first and second radio communication devices and (b) the circuit-oriented telephone connection between the first and second radio communication devices, during the communication session between the first and second radio communication devices, in response to a change from a first communication situation suitable for the first communication connection to a second communication situation suitable for a second, different communication connection, the first radio communication device initiating a switch from the first communication connection to the second communication connection, the second communication connection comprising the other one of (a) the packet-oriented PTT communication connection between the first and second radio communication devices and (b) the circuit-oriented telephone connection between the first and second radio communication devices, and after the switch, continuing the communication session between the first and second radio communication devices via the second communication connection, wherein the switch from the first communication connection to the second communication connection comprises activating the second communication connection while the first communication connection still exists.

* * * * *